US008935389B2

United States Patent
Pedigo et al.

(10) Patent No.: US 8,935,389 B2
(45) Date of Patent: Jan. 13, 2015

(54) METHOD AND SYSTEM FOR COLLECTING AND MANAGING NETWORK DATA

(75) Inventors: Jeffrey S. Pedigo, Boulder, CO (US); Jason K. Schnitzer, Boulder, CO (US); Andrew W. Sundelin, Denver, CO (US)

(73) Assignee: Guavus, Inc., San Mateo, CA (US)

( * ) Notice: Subject to any disclaimer, the term of this patent is extended or adjusted under 35 U.S.C. 154(b) by 289 days.

(21) Appl. No.: 13/474,601

(22) Filed: May 17, 2012

(65) Prior Publication Data

US 2012/0297061 A1 Nov. 22, 2012

Related U.S. Application Data

(60) Provisional application No. 61/486,852, filed on May 17, 2011.

(51) Int. Cl.
*G06F 15/16* (2006.01)
*H04L 12/26* (2006.01)
*H04L 12/14* (2006.01)
*H04L 29/08* (2006.01)
*H04L 12/24* (2006.01)

(52) U.S. Cl.
CPC ............ *H04L 43/12* (2013.01); *H04L 12/1403* (2013.01); *H04L 67/327* (2013.01); *H04L 41/0213* (2013.01)
USPC .......................................... 709/224; 709/208

(58) Field of Classification Search
USPC .................................................. 709/208, 224
See application file for complete search history.

(56) References Cited

U.S. PATENT DOCUMENTS

| | | | | |
|---|---|---|---|---|
| 2006/0002386 | A1* | 1/2006 | Yik et al. | 370/389 |
| 2010/0169475 | A1* | 7/2010 | Woundy et al. | 709/224 |
| 2011/0137777 | A1* | 6/2011 | Margonis et al. | 705/34 |

* cited by examiner

*Primary Examiner* — Ebrahim Golabbakhsh
(74) *Attorney, Agent, or Firm* — Morgan, Lewis & Bockius LLP

(57) ABSTRACT

Some embodiments include a method and/or a system for collecting and managing network data. Other embodiments of related methods and systems are disclosed.

20 Claims, 12 Drawing Sheets

METHOD AND SYSTEM FOR COLLECTING AND MANAGING NETWORK DATA

CROSS-REFERENCE TO RELATED APPLICATIONS

This application claims the benefit of U.S. Provisional Application No. 61/486,852, filed May 17, 2011. U.S. Provisional Application No. 61/486,852 is incorporated herein by reference in its entirety.

FIELD OF THE INVENTION

This invention relates generally to the implementation of systems and methods for collecting and managing networking events, and relates more particularly to systems and methods suitable for collecting, distributing, and managing Internet Protocol Detail Record data streams.

DESCRIPTION OF THE BACKGROUND

Service Providers worldwide are increasingly concerned over the rising degree of network capacity resources consumed by their subscribers. New Internet applications and increasingly richer media content generate a voracious appetite for network capacity resources. Meanwhile, despite the increasing demand on network capacity resources, subscribers' expectations for enhanced service experience continues to increase as well.

Rising subscriber use of network capacity resources within the broadband access networks of cable broadband service providers impacts the cable broadband service providers' Data Over Cable Service Interface Specification (DOCSIS) infrastructures. With the introduction of the DOCSIS 3.0 standard, network device support for Internet Protocol Detail Record (IPDR) is now mandatory. IDPR enables visibility into DOCSIS Service Flows which carry subscriber data across broadband access networks using the DOCSIS 2.0 or 3.0 standard. With cable broadband service providers deploying subscriber usage metering, acceptable use policies, and usage based billing systems based on information gathered using IPDR, the reliable collection and accurate analysis of IPDR data is critical.

Various complex factors influence the behavior of IPDR-based measurements when applied to subscriber usage metering scenarios in DOCSIS networks. One exemplary class of network event measurements is a standard data model referred to as IPDR Subscriber Accounting Management Interface Specification (SAMIS) data. Generally, cable broadband service providers view SAMIS data described in the DOCSIS specifications as a preferred source of data from which to determine subscriber usage in DOCSIS networks. However, without appropriate methods and systems for evaluating the SAMIS data to calculate subscriber usage, collecting and analyzing SAMIS data can be unreliable and inaccurate.

Cable broadband operators attempting to implement IPDR-based subscriber usage metering and billing systems have been met by an observant and critical subscriber and consumer advocacy community. Discrepancies in subscriber usage results that were found when comparing values collected by service providers to those taken independently by their subscribers have caused concern in the broadband industry. Accordingly, cable broadband service providers can be expected to face increasing scrutiny as Internet metering and usage based billing systems become more prevalent.

A related area of concern exists regarding what types of Internet traffic are included in the calculation of subscriber usage values. While the majority of Internet traffic sent to or from a subscriber is consumed by end-user applications, additional traffic is generated on the network for management, maintenance, and protocol overhead. It is generally accepted that this administrative traffic should not be included in the calculation of a subscriber's usage values.

The methods and systems described herein for collecting and managing network data enable cable broadband service providers to reliably collect and accurately analyze, in a timely manner, subscriber Internet usage values based on IPDR data from DOCSIS networks.

BRIEF DESCRIPTION OF THE DRAWINGS

To facilitate further description of the embodiments, the following drawings are provided in which.

Figure 1:
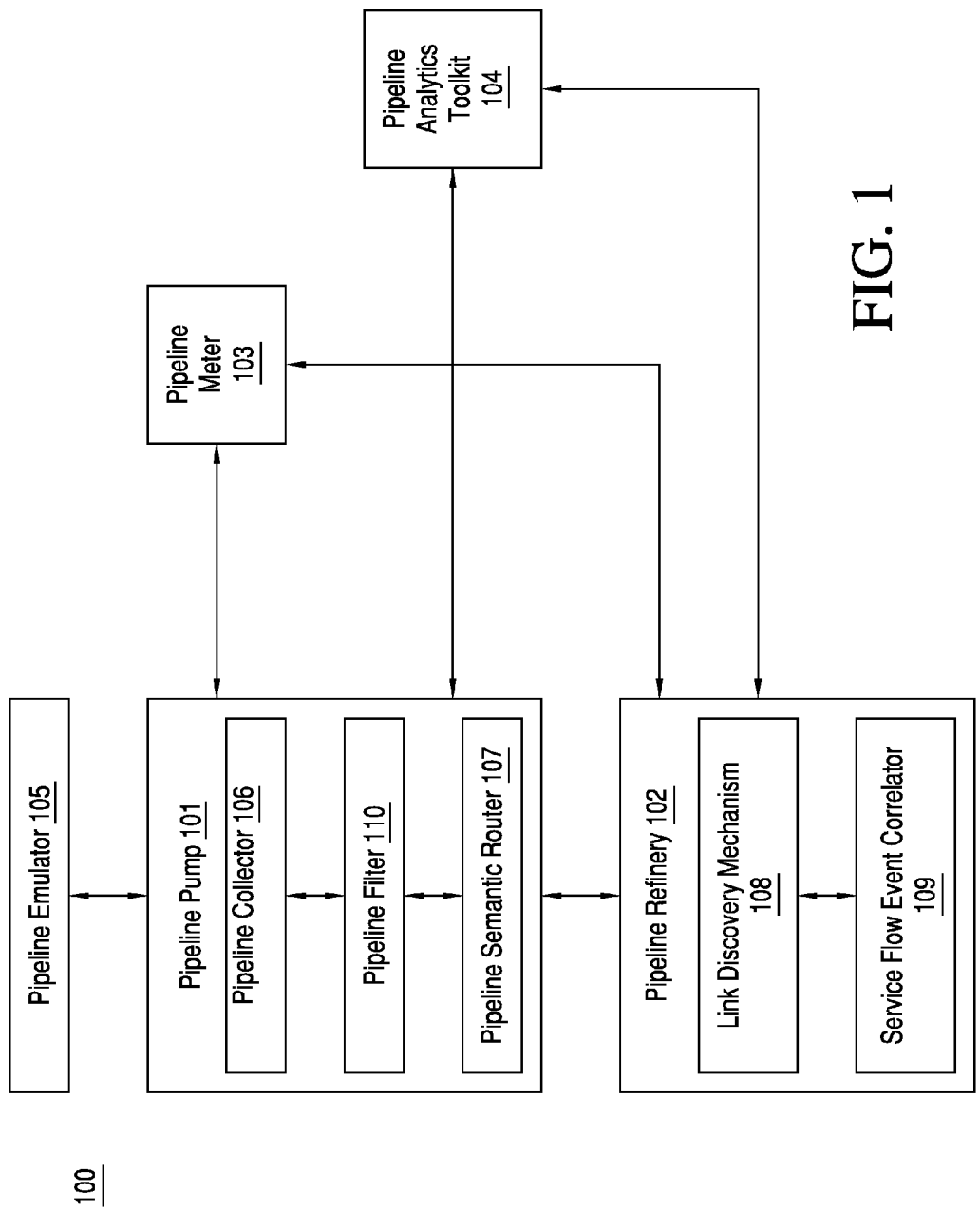
FIG. 1 illustrates a block diagram of a system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

The term "database" as used herein refers to a location for storing information or data, and/or a mechanism for storing information or data. As such, the term "database" can be used interchangeably with related terms, such as, for example, data storage, data store, etc.

The term "normalize" as used herein refers to evaluating a record and producing a "normalized" representation consisting of a common record format. For example, non-normalized network data may be based on differing protocol versions and/or vendor implementations. As such, even in situations where common and standard schemas are present, the structural, syntactical, and logical meaning of common fields can be different across different vendor implementations. Accordingly, this data can be normalized to a common record format such that data from multiple or all of the different protocol versions and/or vendor implementations has a common schema.

The term "record stream" as used herein refers to a series of data records. These data records can have an associated timestamp, but do not necessarily arrive at a location in temporal order according to their timestamp.

The term "service flow" as used herein refers to a flow of end-user data with a common quality of service (QoS) and other common characteristics being monitored by the system.

The term "semantic routing" as used herein refers to routing information based on its characteristics, such as a source and/or format. For example, semantic routing can be used to route a data stream to a particular software application based on its source and/or format. If the source or data format of the data stream were to change, the data stream could then be routed to a different software application.

The term "semantic routing rule set" as used herein refers to a set of rules or criteria which reflect the meaning of the data and by which routing decisions are made. Typically, multiple semantic routing rule sets are provided to facilitate different routing for different data sets.

The term "template" as used herein refers to a set of fields making up an individual data record. A template can be used for decoding or encoding individual data records. A set of records in the same data collection session generally can share the same template.

DETAILED DESCRIPTION OF EXAMPLES OF EMBODIMENTS

Some embodiments include a system for collecting and managing one or more data records of a computer network. The system comprises: a pipeline pump comprising a first pipeline collector, a first pipeline filter, and a pipeline semantic router. The first pipeline collector, the first pipeline filter, and the pipeline semantic router can be configured to communicate with each other. The one or more data records of the computer network can comprise at least one first data record. Further, the first pipeline collector can be configured to receive the at least one first data record and to discover a first vendor implementation of the at least one first data record. Meanwhile, the first pipeline filter can be associated with the first vendor implementation of the at least one first data record, can be configured to receive the at least one first data record from the first pipeline collector after the first pipeline collector discovers the first vendor implementation of the at least one first data record, and/or can be configured to normalize the at least one first data record into at least one first normalized data record. Further still, the pipeline semantic router can be configured to receive the at least one first normalized data record and to make available the at least one first normalized data record to the computer network based on at least one first semantic rule.

Various embodiments include a method of manufacturing a system for collecting and managing one or more data records of a computer network. The method can comprise: fabricating a pipeline pump comprising a first pipeline collector, a first pipeline filter, and a pipeline semantic router; and configuring the first pipeline collector, the first pipeline filter, and the pipeline semantic router to communicate with each other. Further, fabricating the pipeline pump can comprises: configuring the first pipeline collector to receive at least one first data record and to discover a first vendor implementation of the at least one first data record, the one or more data records of the computer network comprising the at least one first data record; configuring the first pipeline filter (a) to receive the at least one first data record from the pipeline collector after the pipeline collector discovers the first vendor implementation of the at least one first data record and (b) to normalize the at least one first data record into at least one first normalized data record, the first pipeline filter being associated with the first vendor implementation of the at least one first data record; and configuring the pipeline semantic router to receive the at least one first normalized data record and to make available the at least one first normalized data record to the computer network based on at least one first semantic rule.

Further embodiments include a method for collecting and managing one or more data records of a computer network. The method can be configured to be implemented as one or more computer instructions configured to be run at one or more processing modules of a computer system and stored at one or more memory storage modules of the computer system. The method can comprise: executing one or more first computer instructions configured to receive at least one first data record of the one or more data records of the computer network; executing one or more second computer instructions configured to discover a first vendor implementation of the at least one first data record; executing one or more third computer instructions configured to normalize the at least one first data record into at least one first normalized data record; and executing one or more fourth computer instructions configured to make available the at least one first normalized data record to the computer network based on at least one first semantic rule. The computer instruction(s) can comprise the first, second, third, and/or fourth computer instructions.

Turning to the drawings, FIG. 1 illustrates a block diagram of system 100, according to an embodiment. System 100 is merely exemplary and is not limited to the embodiments presented herein. System 100 can be employed in many different embodiments or examples not specifically depicted or described herein. System 100 can be implemented to collect, distribute, and/or manage data records of network 200 (FIG. 2).

System 100 can comprise one or more modules, such as, for example, Pipeline Pump 101, Pipeline Refinery 102, Pipeline Meter 103, Pipeline Analytics Toolkit 104, and/or Pipeline Emulator 105. In some embodiments, Pipeline Pump 101 can comprise additional modules, such as, for example, Pipeline Collector 106, Pipeline Filter 110, and/or Pipeline Semantic Router 107. In further embodiments, Pipeline Refinery 102 can comprise additional modules, such as, for example, Link Discovery Mechanism 108 and/or Service Flow Event Correlator (SFEC) 109. The module(s) (e.g., Pipeline Pump 101, Pipeline Refinery 102, Pipeline Meter 103, Pipeline Analytics Toolkit 104, Pipeline Emulator 105, Pipeline Collector 106, Pipeline Semantic Router 107, Link Discovery Mechanism 108, Service Flow Event Correlator 109, and/or Pipeline Filter 110), which will be described in greater detail herein, can be configured to communicate with each other. These module names are used for illustrative purposes and are not necessarily a feature of system 100. Accordingly, these module names should not be read as limiting the scope of the invention, but rather as descriptive to help to identify at least some of the functionality of the modules.

In many embodiments, system 100 can be implemented as software. Accordingly, system 100 can be implemented as one or more computer instructions configured to be run at one or more processing modules and/or stored at one or more memory modules of a computer system. The computer system can be similar or identical to computer system 1300 (FIG. 13), as described herein.

Figure 2:
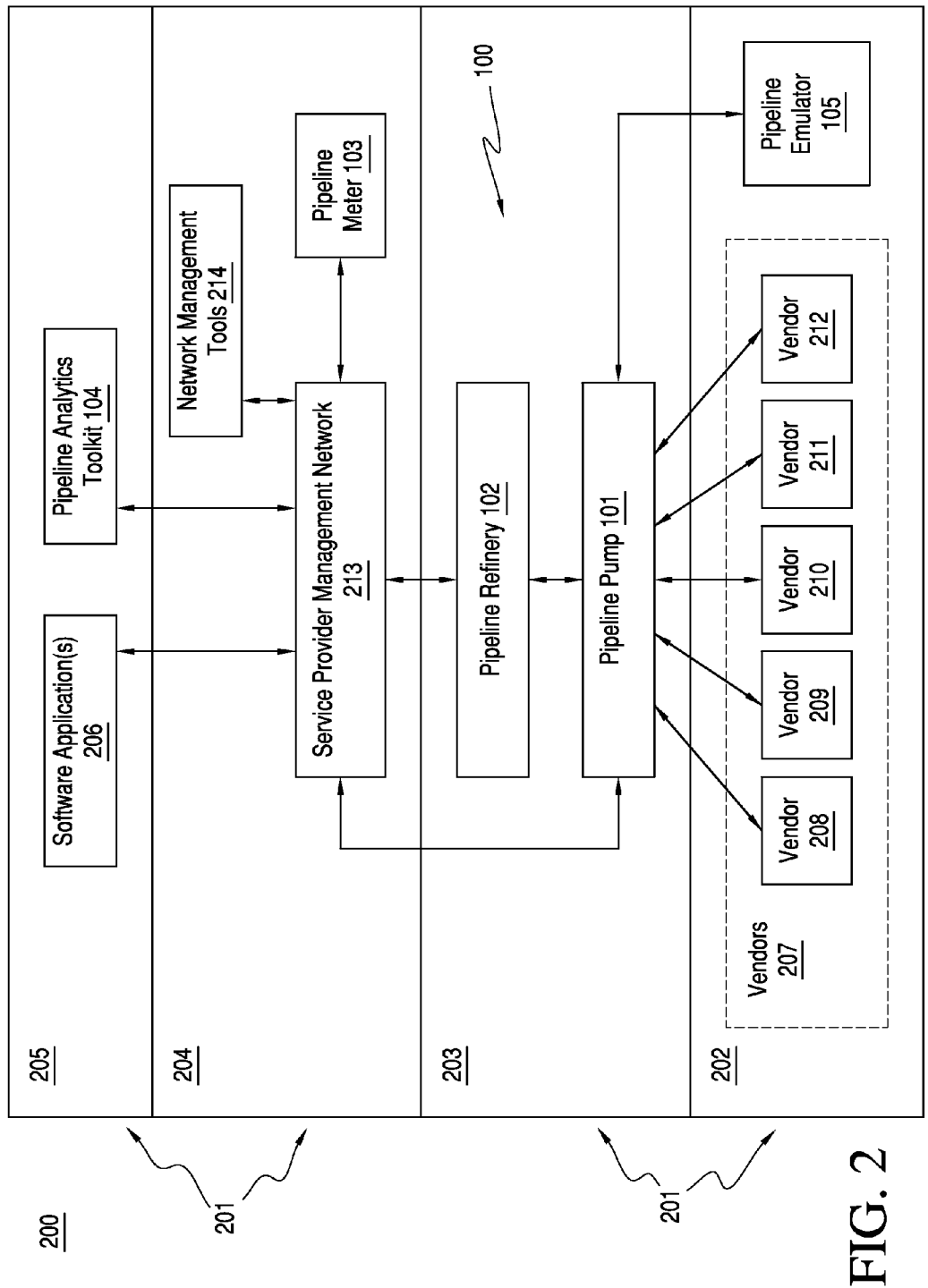
FIG. 2 illustrates an exemplary network where the system of FIG. 1 is being implemented therewith.

In some embodiments, system 100 (FIG. 1) can operate with a network 200 (FIG. 2) and/or as part of network 200 (FIG. 2). In other embodiments, network 200 (FIG. 2) can be part of system 100 (FIG. 1). FIG. 2 illustrates network 200 where system 100 is being implemented therewith, according to the embodiment of FIG. 1.

Referring to FIG. 2, network 200 is merely exemplary and is not limited to the embodiments presented herein. Network 200 can be employed in many different embodiments or examples not specifically depicted or described herein. In many embodiments, network 200 can refer to a computer network.

Network 200 can comprise one or more network layers 201. For example, network layer(s) 201 can comprise first network layer 202, second network layer 203, third network layer 204, and/or fourth network layer 205. In other embodiments, network layer(s) 201 can comprise more or less than four network layers (e.g., first network layer 202, second network layer 203, third network layer 204, and/or fourth network layer 205).

First network layer 202 can refer to a network element layer where data record streams can be generated. Next, second network layer 203 can refer to an element management layer where the data record streams can be processed into network data. Meanwhile, third network layer 204 can refer to a network management layer where the network data can be distributed to different service providers. Finally, fourth network layer 205 can refer to a service management layer at which one or more software applications 206 (e.g., a billing software application, a customer portal software application, a certificate signing request software application, a provisioning software application, a mediation software application, etc.) can process the network data to manage network 200.

In implementation, the data records can be generated at first network layer 202 as part of the normal operation of network 200 to provide at least one data record stream. For example, a plurality of vendors 207 (e.g., vendors 208 through 212) can generate data records as multiple data record streams having a variety of formats. Further, as illustrated at FIG. 2, vendor 208 could generate a record stream in Extensible Markup Language/Transmission Control Protocol (XML/TCP), while vendor 209 could provide a second record stream in the form of an IPDR stream. Furthermore, data contained within each data record comprising the record streams may have its own schema depending on a vendor's implementation.

In many embodiments, third network layer 204 can exist above second network layer 203. Third network layer 204 can comprise service provider management network 213. Third network layer 204 can also comprise one or more network management tools 214. Network management tool(s) 214 can be owned by service providers and used to manage their networks.

Referring now to both FIGS. 1 & 2, Pipeline Pump 101 can operate as a high performance network data record collector and router. Accordingly, Pipeline Pump 101 can robustly collect, process, and semantically route the data records of network 200. These data records can be configured according to a plurality of vendor implementations (e.g., IPDR and/or XML/TCP) and can be made available as the data records stream to Pipeline Pump 101 for collection, routing, and normalization of the data records. As illustrated at FIG. 2, Pipeline Pump 101 can exist at second network layer 203. In other embodiments, Pipeline Pump 101 can exist at one or more different network layers of network layers 201.

Pipeline Pump 101 and/or Pipeline Collector 106 can be configured to collect the data records of the data record streams. In many embodiments, when Pipeline Collector 106 establishes a connection to a managed device, Pipeline Collector 106 can discover (e.g., automatically) the vendor implementation of the data records of the data record stream associated with that managed device. For example, Pipeline Collector 106 can discover (e.g., automatically) the vendor implementation by reading a vendorID field within a message establishing a connection with the managed device. Upon discovering the vendor implementation, Pipeline Collector 106 can adapt the protocol behavior of Pipeline Pump 101 and/or Pipeline Collector 106 to anomalous protocol behavior of the vendor implementation for the particular managed device. Anomalous protocol behavior can refer to protocol behavior that is either non-conformant to the IPDR specification, or that is conformant but that is also unique among vendor IPDR implementation. An example of anomalous protocol behavior could include an IPDR exporter terminating a session implicitly (e.g., initiating a Session Stop) without first receiving a specific termination message, as required by the protocol. Accordingly, Pipeline Collector 106 can support the vendor implementation diversities of one or more vendors (e.g., vendors 207, vendor 208, vendor 209, vendor 210, vendor 211, and/or vendor 212) and optimize the performance of the data collection for the vendor(s). In some embodiments, Pipeline Pump 101 and/or Pipeline Collector 106 can additionally support the implementation of one or more managed devices with conformant vendor protocol behaviors. Conformant vendor protocol behavior can refer to protocol behavior that exports IPDR data in a manner compliant with traditional IPDR specifications, such as, for example, semantically valid data elements or the transmission of consecutive events within the time limits specified for the managed device (e.g., a minimum of one record event per Service Flow every 900 seconds).

Following the collection of the data records, Pipeline Pump 101 and/or Pipeline Filter 110 can normalize the data records. In some embodiments, Pipeline Pump 101 and/or Pipeline Filter 110 can normalize the data records by utilizing a template associated with the discovered vendor implementation for the data record being normalized. The template can identify each field within the data record, enabling Pipeline Pump 101 and/or Pipeline Filter 110 to arrange vendor specific fields and formats into a normalized data record. A vendor specific field can refer to a data element within an IPDR that is encoded in a manner that is unique to a particular vendor or that has a different interpretation. For example, a data record can contain Internet Protocol address information or a textual field (string) uniquely describing a network interface that uses a format or attribute proprietary to the vendor of the data record. In some embodiments, the data types and content of the data records are converted to forms and values conformant to the normalized data record. In this way, data records of various vendor implementations can be processed without requiring separate and/or different processing modules or instructions corresponding to the various vendor implementations.

After Pipeline Pump 101 and/or Pipeline Filter 110 normalizes the data records, Pipeline Pump 101 and/or Pipeline Semantic Router 107 can route the normalized data records according to at least one semantic rule set. For example, Pipeline Pump 101 and/or Pipeline Semantic Router 107 can route a normalized data record according to the semantic rule set(s) that match and/or most closely match the characteristics of that normalized data record. The semantic rule set(s) could include characteristics such as a source of the normalized data record (e.g., Cable Modem Termination System (CMTS)), a data model (e.g., IPDR service definition) of the normalized data record, one or more routing destinations or targets for the normalized data record, one or more specific data model elements to include/exclude from within the data model (e.g., a network interface index), a format of the normalized record (e.g., binary XML-Data Reduced (XDR), XML, formatted text, etc.), and/or a data transmission protocol employed to forward normalized records to the destination(s) (e.g., IPDR, File Transfer Protocol, Secure Copy, etc.). Pipeline Pump 101 and/or Pipeline Semantic Router 107 can be configured with an export function having its own template used to select specific elements within each data record of a record stream. Further, multiple export functions can be instantiated for the same record stream. Accordingly, a single record stream from a source (e.g., a managed device) can be efficiently distributed to multiple software applications within a service provider environment which may have different input requirements.

The IPDR protocol can allow for a "primary" or "active" collector and one or more "secondary" or "standby" collectors. In some embodiments, the one or more secondary/standby collectors can also be ranked according to a priority structure.

The export function of Pipeline Pump 101 and/or Pipeline Semantic Router 107 further can provide failover and failback capabilities between the exporter and a set of collection engines (e.g., collectors). Accordingly, if the primary/active collector fails, Pipeline Pump 101 can select queuing of another collector (e.g., a secondary/standby collector of the secondary/standby collectors) to instate as the active collector. For example, Pipeline Pump 101 can select in place of the failed collector another collector that has a live connection and that meets or most closely meets one or more selection criteria, such as, but not limited to, a collector subnet address. Further, if a higher priority collector re-establishes a connection, Pipeline Pump 101 can deactivate the other collector (e.g., the secondary/standby collector of the secondary/standby collectors) and select and/or re-select, as applicable, the higher-priority collector to be the active collector.

In many embodiments, the architecture of Pipeline Pump 101 can optimize use of multicore/multithreaded processing and concurrency to increase the performance of the data processing and record event analysis provided by Pipeline Pump 101.

In some embodiments, Pipeline Pump 101 can use a Pipeline Internal File (PIF) exchange format for efficiently encoding multiple information models encapsulated in data records from multiple sources (e.g., multiple managed devices) into a single file structure representation. This multiplexing can allow for compression of the information, efficient retrieval of the data at a later state, and recreation of the protocol messaging associated with a given data set.

Figure 3:
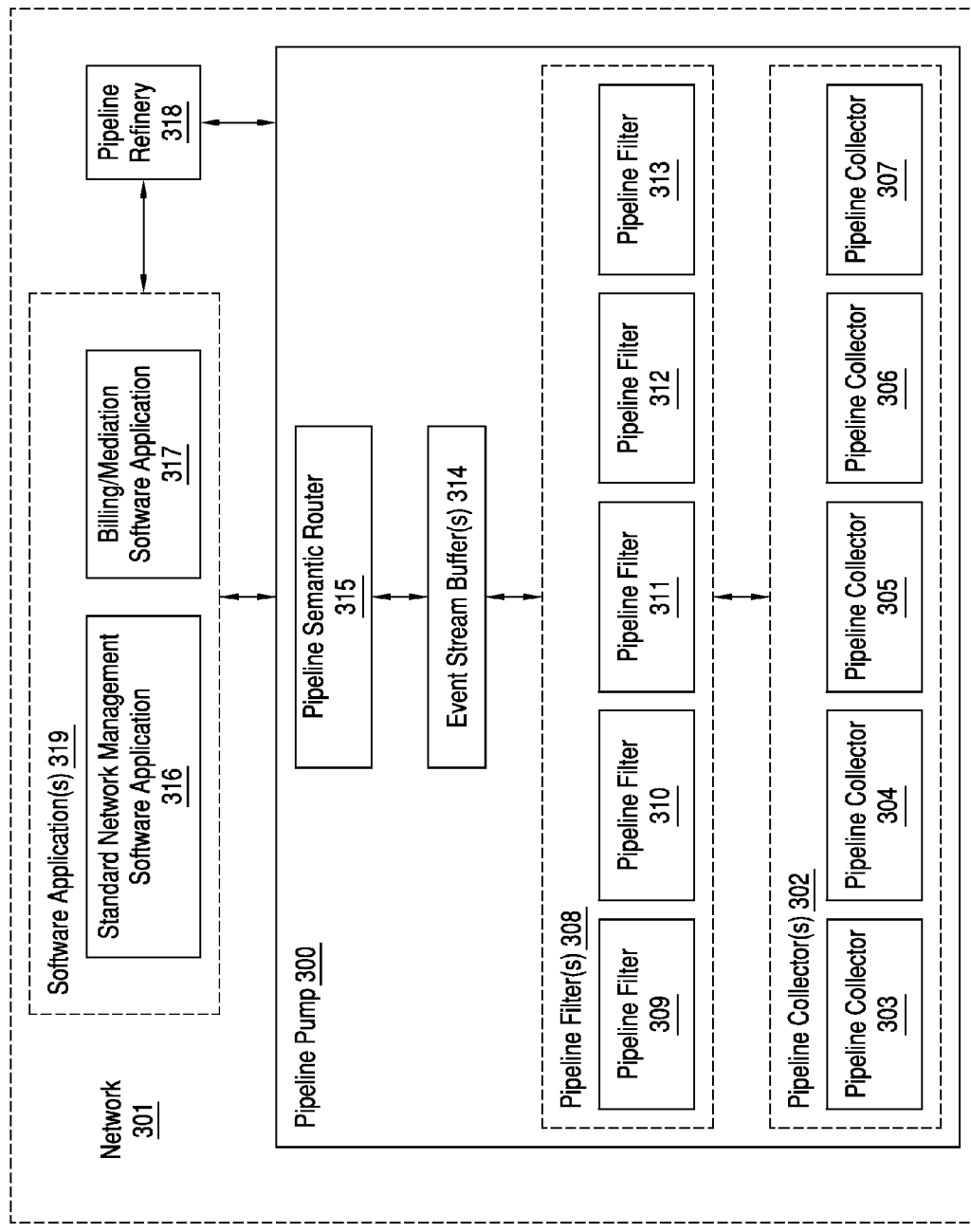
FIG. 3 illustrates a block diagram of an exemplary Pipeline Pump, according to an embodiment.

Turning ahead now in the drawings, FIG. 3 illustrates a block diagram of an exemplary Pipeline Pump 300, according to an embodiment. Pipeline Pump 300 can be similar or identical to Pipeline Pump 101 (FIGS. 1 & 2). Consistent with the description of Pipeline Pump 101 (FIGS. 1 & 2), information at FIG. 3 flows from the lower portion of the FIG. 3 (e.g., starting with collection of one or more data records) to the upper portion of FIG. 3 (e.g., ending with routing of the normalized data records).

Pipeline Pump 300 can be connected to and/or in communication with network 301. Network 301 can be similar or identical to network 200 (FIG. 2). Network 200 can communicate with Pipeline Pump 101 (and Network 301 can communicate with Pipeline Pump 300) through IPDR/Streaming Protocol (SP) data records, although other formats can be implemented, as described below.

Pluggable protocol support can be provided through the use of Pipeline Collectors 302 (e.g., Pipeline Collector 303, Pipeline Collector 304, Pipeline Collector 305, Pipeline Collector 306, and/or Pipeline Collector 307) and corresponding Pipeline Filters 308 (e.g., Pipeline Filter 309, Pipeline Filter 310, Pipeline Filter 311, Pipeline Filter 312, and/or Pipeline Filter 313). In many embodiments, Pipeline Collectors 302 and/or Pipeline Filters 308 can be vendor implementation specific. Accordingly, Pipeline Pump 300 can comprise Pipeline Collectors 302 and/or Pipeline Filters 308. Further, each of Pipeline Collectors 302 can be similar or identical to Pipeline Collector 106 (FIG. 1), and/or each of Pipeline Filters 308 can be similar or identical to Pipeline Filter 110 (FIG. 1).

Pipeline Pumps 101 (FIG. 1) and 300 can recognize fields within a connection establishment message identifying the vendor implementation and can modify their protocol engine to optimally interoperate with that vendor implementation. For example, an IPDR/SP connection establishment message can contain fields identifying a vendor implementation, and Pipeline Pumps 101 (FIG. 1) and 300 can use the fields to identify the vendor implementation. As illustrated at FIG. 3, Pipeline Collectors 302 can comprise five different vendor-specific pipeline collectors (e.g., Pipeline Collector 303, Pipeline Collector 304, Pipeline Collector 305, Pipeline Collector 306, and/or Pipeline Collector 307), and/or Pipeline Filters 308 can comprise five Pipeline Filters (e.g., Pipeline Filter 309, Pipeline Filter 310, Pipeline Filter 311, Pipeline Filter 312, and/or Pipeline Filter 313) corresponding to the different vendor-specific pipeline collectors. However, in other embodiments, Pipeline Collectors 302 can comprise more or less vendor-specific pipeline collectors, and/or Pipeline Filters 308 can comprise more or less pipeline filters corresponding to the vendor-specific pipeline collectors. In many embodiments, Pipeline Collectors 302 can be internally identical except for the logging functions associated therewith. In some embodiments, a vendor can have multiple implementations such that there could be multiple pipeline collectors associated with a particular vendor. In further embodiments, one or more of Pipeline Collectors 302 can be protocol-specific. In many embodiments, Pipeline Collectors 302 can be configured to collect data from IPDR/SP exporters, as illustrated at FIG. 3, and/or XML/TCP protocol exporters. One or more of Pipeline Collectors 302 can also be configured to collect data from other protocols (e.g., simple network management protocol (SNMP), TR-69 protocol, etc.). Furthermore, in various embodiments, Pipeline Collectors 302 need not perform vendor-specific optimization or protocol remediation as a default protocol engine of Pipeline Pump 300 and, instead, can be used to collect from standards-based implementations of unrecognized vendors.

Pipeline Collectors 302 can provide vendor implementation-specific data records to corresponding Pipeline Filters 308. In some embodiments, the data records can be provided to Pipeline Filters 308 in a Pipeline Internal File (PIF) exchange format or another suitable exchange format. Similar to Pipeline Collectors 302, in some embodiments, one or more of Pipeline Filters 308 can be associated with multiple ones of Pipeline Collectors 302, or one Pipeline Collector of Pipeline Collectors 302 can be associated with multiple ones of Pipeline Filters 308. FIG. 3 can illustrate a single Pipeline Filter of Pipeline Filters 308 associated with each Pipeline Collector of Pipeline Collectors 302. Each Pipeline Filter of Pipeline Filters 308 can be responsible for normalizing the vendor implementation-specific data record provided by the associated Pipeline Collector to generate a normalized data record. As such, each Pipeline Filter can have a particular set of rules to apply to a data record to generate a common compatible (e.g., normalized) data record format from each vendor implementation.

In some embodiments, Pipeline Filters 308 can organize the normalized data records into one or more event stream buffers 314. Event stream buffer(s) 314 can provide for data recovery and persistence. Accordingly, Pipeline Pump 300 can comprise event stream buffer(s) 314.

In various embodiments, Pipeline Pump 300 can comprise a pipeline semantic router 315. Pipeline semantic router 315 can be similar or identical to Pipeline Semantic Router 107 (FIG. 1). Pipeline Semantic Router 315 can receive normalized records from event stream buffer(s) 314 and route the normalized records to an appropriate target. The normalized records can be exported in various formats and/or protocols, depending on the intended target. An appropriate target can generally be determined based on one or more semantic routing rules. The semantic routing rule(s) can be similar or identical to the semantic routing rules described above with respect to Pipeline Semantic Router 107 (FIG. 1). Pipeline semantic router 315 can use templates to select specific elements within each normalized record to transfer only needed data to data consumers (e.g., at the appropriate and/or intended target). Further, the resulting record stream can be efficiently distributed to multiple software applications within the service provider environment.

The following example traces the path of a data record as it passes through Pipeline Pump 300. This specific example uses a particular format related to a vendor implementation, but other formats and vendor implementations are within the scope of the embodiments. A source (e.g., a managed device, such as, for example, a CMTS) in a network, such as network 301, can generate a data record such as an IPDR/SP that is transmitted to Pipeline Pump 300. Pipeline Pump 300 can evaluate one or more fields within the IPDR/SP identifying the data record as being a specific to a vendor implementation (e.g., Motorola, Cisco, Casa, ARRIS, etc.). A Pipeline Collector of Pipeline Collectors 302 that is associated with the identified vendor implementation can optimize the protocol engine of Pipeline Pump 300 and/or the Pipeline Collector of Pipeline Collectors 302 for the vendor implementation. Then, Pipeline Pump 300 and/or the Pipeline Collector of Pipeline Collectors 302 can output the data record to a Pipeline Filter of Pipeline Filters 308 corresponding to that Pipeline Collector of Pipeline Collectors 302 to process (e.g., normalize) the data record. Accordingly, the Pipeline Filter of Pipeline Filters 308 can convert the vendor-specific data record (e.g., an IPDR/SP data record) into a normalized data record (e.g., a PIF format file). The Pipeline Filter of Pipeline Filters 308 can provide the normalized data record (e.g., via event stream buffer(s) 314) to pipeline semantic router 315. Then, pipeline semantic router 315 can implement (a) semantic routing rules and, in some embodiments, the data within the normalized record such as the source and the data model to determine which software application(s) should be sent the data record and/or (b) one or more templates to select specific elements within the normalized data record to transmit. Thus, particular elements of one normalized record can be routed to multiple software applications and/or Pipeline Refinery 318. The particular elements can then be transmitted to one or more of software application(s) 319 and/or Pipeline Refinery 318 in a compatible exchange format. Software application(s) 319 can be similar or identical to software application(s) 206 (FIG. 2). For example, standard network management software application 316 can be provided Diagnostic Service Definition record streams using the IPDR protocol; billing/mediation software application 317 can be provided a SAMIS Service Definition record stream with each data record containing only specific elements as a comma separated value/secure copy protocol (CSV/SCP) format; and/or an entire normalized SAMIS record stream can be transmitted, as is, to Pipeline Refinery 318 in a PIF format. Accordingly, software application(s) 319 can comprise standard network management software application 316, billing/mediation software application 317, etc. Pipeline Refinery 318 can be similar or identical to Pipeline Refinery 102 (FIGS. 1 & 2), as described here in below.

Returning now to FIGS. 1 & 2, Pipeline Refinery 102 can operate as a DOCSIS event correlation and service metrics engine. Pipeline Refinery 102 can correlate the data records (e.g., the normalized data records provided by Pipeline Pump 101) and derive key metrics for enterprise wide data distribution. Likewise, Pipeline Refinery 102 can aggregate disparate data records including DOCSIS events into accurate device Service Flow Journals.

Pipeline Refinery 102 can be responsible for refining the data records (e.g., the normalized data records) generated by Pipeline Pump 101. Pipeline Refinery 102 can receive the data records from Pipeline Pump 101 as a data stream. As illustrated at FIG. 2, Pipeline Refinery 102 can exist at second network layer 203. In other embodiments, Pipeline Refinery 102 can exist at one or more different network layers of network layers 201. Pipeline Refinery 102 can perform one or more tasks to refine the normalized data records including error detection and handling, discovery of the network topology, and Service Flow Event Correlation (SFEC), as described below.

Pipeline Refinery 102 can be configured to detect and identify erroneous data records and record data within the record stream. For example, a data record itself can be erroneous and/or record data (e.g., temporal order or structural data) can be erroneous within an otherwise non-erroneous data record. Pipeline Refinery 102 can be configured to detect generalized errors (e.g., data records with timestamps arriving out of order). Further, Pipeline Refinery 102 can be configured to detect specific types of errors (e.g., an incorrectly time-stamped data record resulting from a clock management defect within an exporter).

Pipeline Refinery 102 can score the relative accuracy and/or validity of a single data record from the record stream in order to evaluate the quality and/or timeliness of the encoded data values of the data record. This scoring data can be encoded and the data record can be annotated with the encoded scoring data. In many embodiments, quality of data can be evaluated and/or scored by Pipeline Refinery 102 based on internal rules and algorithms that parameterize acceptable data values. For example, if a data element representing a count of packets or octets traversing a Service Flow increments an invalid and/or impossible amount, Refinery Pipeline 102 can detect the invalid and/or impossible increment by calculating a maximum possible increment value knowing the maximum rate at which the counter could adjust (e.g., packets per second, bits per second, etc.) and the period of time observed between two successive counter data records. A suitable value of acceptable timeliness is determined by tolerances configured for the software application(s) consuming data records of Pipeline Refinery 102. For example, a soft real time system such as an automated subscriber abuse control software application(s) can define a five minute tolerance for the timeliness of data in order to reduce abuse detection and enforcement delay. A software application with less rigid response or performance requirements, such as a network capacity management system, can tolerate longer data record latencies of up to an hour.

Pipeline Refinery 102 and/or Link Discovery Mechanism 108 can be configured to generate a network topology. Pipeline Refinery 102 and/or Link Discovery Mechanism 108 can be configured to discover (e.g., automatically) the network topology based on the record streams. For example, Pipeline Refinery 102 and/or Link Discovery Mechanism 108 can determine device and connectivity relationships within the network such as Cable Modem Termination System (CMTS), interface, nodes, content management Cable Modem (CM), and/or Service Flows by analyzing network topology relationships across all data records in a data stream. Various algorithms and methods can be implemented to discover the network topology.

Further, Pipeline Refinery 102 and/or Link Discovery Mechanism 108 can be configured to efficiently encode and store the device and connectivity relationships as a compact representation thereof. For example, after Pipeline Refinery 102 and/or Link Discovery Mechanism 108 discover the device and connectivity relationships, Pipeline Refinery 102 and/or Link Discovery Mechanism 108 can encode the device and connectivity relationships into a compact format and store the device and connectivity relationships as network topology data. The compact format of the device and connectivity relationships can provide for efficient storage and transmission of network topologies, particularly where the network topology represents a large network system deployment.

Pipeline Refinery 102 and/or Service Flow Event Correlator 109 can be configured to provide Service Flow Event Correlation (SFEC). SFEC correlates data record creation time with service time active record elements to detect inconsistencies with Service Flow Identifiers (SFID). Further, SFEC identifies Cable Modem resets and CMTS SFID re-use in order to correctly assign service counts. SFEC can detect out-of-range or theoretically impossible counter values and recognize them as invalid increments. SFEC can also detect counter rollovers and inconsistent increments. Further still, SFEC can calculate Service Flow Journals as accurate representations of cable modem usage over a selected window of time. In some embodiments, the Service Flow Journal can exclude invalid increments, inconsistent increments, out-of-range and theoretically impossible data record element values across a record stream for a particular Service Flow.

Figure 4:
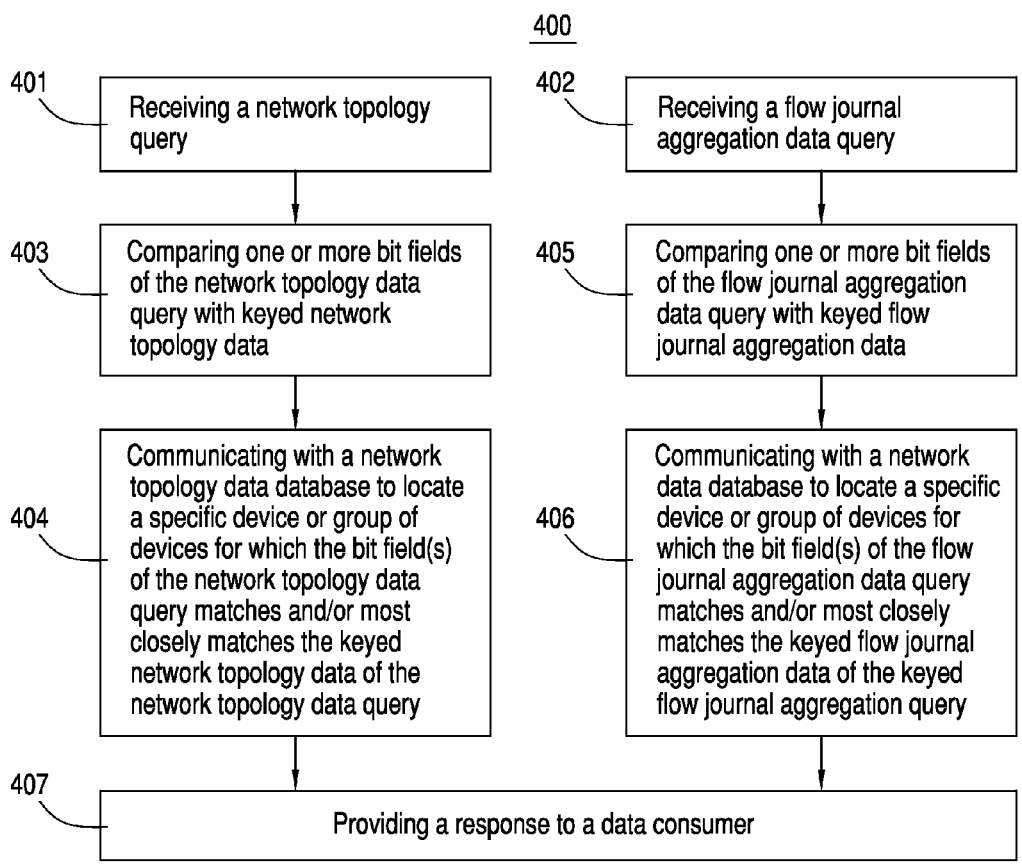
FIG. 4 provides a flow chart illustrating a method of receiving one or more data queries at a Pipeline Refinery and responding to the one or more queries, according to an embodiment.
Figure 6:
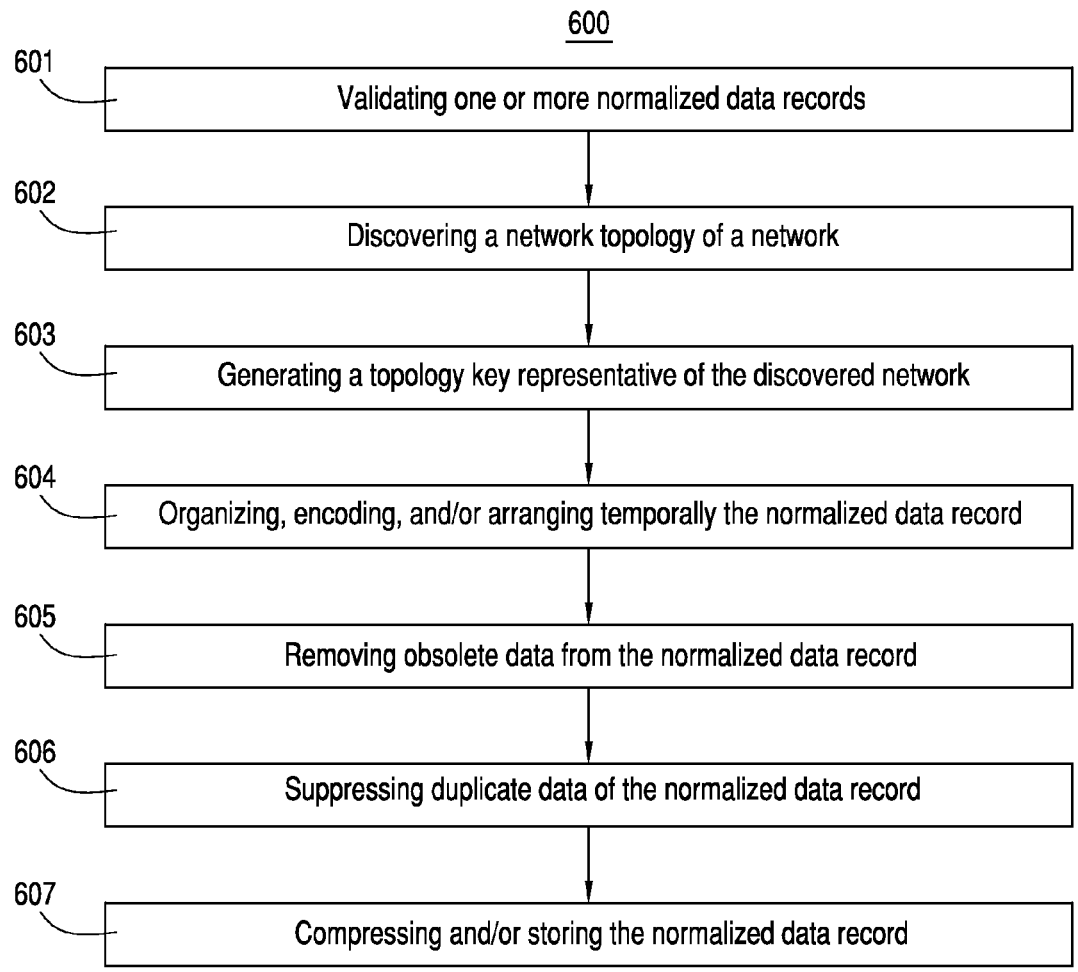
FIG. 6 illustrates an embodiment of a method of (a) ingesting the one or more normalized data records and (b) compressing and/or storing the normalized record(s) into a time-ordered temporal sequence for effective processing of the normalized record(s) and for removing duplicate data of the normalized data record(s)

Pipeline Refinery 102 can be configured to receive one or more data queries. An exemplary data query can comprise (a) a query to interrogate a network topology database for network topology data in order to efficiently evaluate network device locations and other related data including usage, fault, performance, security, capacity, and/or availability metrics and/or (b) a query to interrogate a network data database for network data in order to provide efficient network data retrieval (e.g., a flow journal aggregation query). In some embodiments, the network topology database and the network data database can be the same database or different databases. The network topology database can comprise a data model and file system that persist the connectivity relationships between interconnected network devices and subscriber services. One embodiment of a network topology store for DOCSIS 3.0 networks persists the relationships between CMTSs, CMTS interfaces (logical (e.g., bonding group or media access control (MAC) domain) and/or physical (e.g., downstream radio frequency), hybrid-fiber co-axial (HFC) nodes, subscriber Cable Modem devices, and/or subscriber Service Flows. The network topology data can be keyed according to a hierarchically and topologically organized set of bit fields within a larger primitive data type. Using bit-masking can permit the bit fields to be compared within the keyed network topology data and can accelerate queries into the network topology database in order to locate a specific device or group of devices. In many embodiments, the network data can be keyed in a similar manner to that of the network topology data but with respect to the network data. FIG. 4 provides a flow chart illustrating method 400 of receiving one or more data queries at a Pipeline Refinery and responding to the one or more queries, according to an embodiment. The Pipeline Refinery can be similar or identical to Pipeline Refinery 102 (FIGS. 1 & 2). FIG. 6 illustrates a flowchart illustrating the data flow of a query.

Method 400 can comprise activity 401 of receiving a network topology query and/or activity 402 of receiving a flow journal aggregation data query. When method 400 comprises activity 401, method 400 can continue with activity 403 of comparing one or more bit fields of the network topology data query with keyed network topology data. After performing activity 401 and activity 403, method 400 can further continue with activity 404 of communicating with a network topology data database to locate a specific device or group of devices for which the bit field(s) of the network topology data query matches and/or most closely matches the keyed network topology data of the network topology data query. Further, when method 400 comprises activity 402, method 400 can continue with activity 405 of comparing one or more bit fields of the flow journal aggregation data query with keyed flow journal aggregation data. After performing activity 402 and activity 405, method 400 can further continue with activity 406 of communicating with a network data database to locate a specific device or group of devices for which the bit field(s) of the flow journal aggregation data query matches and/or most closely matches the keyed flow journal aggregation data of the keyed flow journal aggregation query. The network topology database and/or the network data database can be similar or identical to the network topology database and/or the network data database described above with respect to Pipeline Refinery 102 (FIGS. 1 & 2). After performing activity 404 and/or activity 406, method 400 can continue with activity 407 of providing a response to a data consumer.

Returning briefly to FIGS. 1 & 2, in various embodiments, Pipeline Pump 102 can provide data to network management tool(s) 214. In the same or other embodiments, Pipeline Pump 101 can supply data directly to network management tool(s) 214 (rather than providing the data to Pipeline Refinery 102 first).

Figure 5:
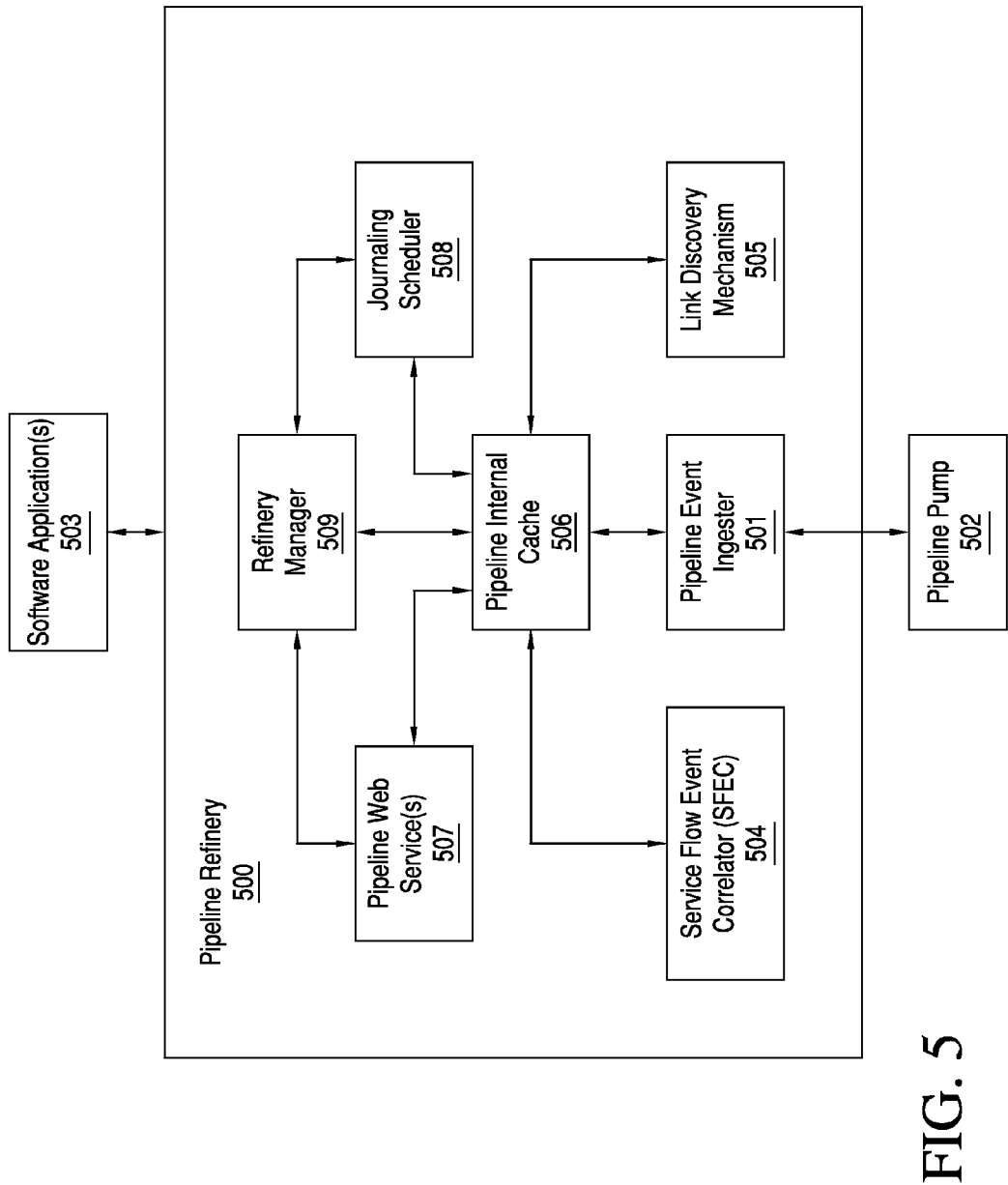
FIG. 5 illustrates a block diagram of an exemplary Pipeline Refinery, according to an embodiment.

Turning ahead now in the drawings, FIG. 5 illustrates a block diagram of an exemplary Pipeline Refinery 500, according to an embodiment. Pipeline Refinery 500 can be similar or identical to Pipeline Refinery 102 (FIGS. 1 & 2). Consistent with the description of Pipeline Refinery 102 (FIGS. 1 & 2), information at FIG. 5 flows generally from bottom to top. Pipeline Refinery 500 can be configured to receive a normalized data record and to make available part or all of the normalized data record to one or more software applications 503. Software application(s) 503 can be similar or identical to software application(s) 319 (FIG. 3) and/or software application(s) 206 (FIG. 2).

Pipeline Refinery 500 can comprise Pipeline Event Ingester 501. Pipeline Refinery 500 can initially receive information at Pipeline Event Ingester 501 in the form of one or more normalized data records provided by Pipeline Pump 502. Pipeline Pump 502 can be similar or identical to Pipeline Pump 101 (FIGS. 1 & 2) and/or Pipeline Pump 300 (FIG. 3).

Pipeline Event Ingester 501 can be configured (a) to ingest the one or more normalized data records and (b) to compress and/or store the normalized record(s) into a time-ordered temporal sequence for effective processing of the normalized record(s) and for removing duplicate data of the normalized data record(s). Accordingly, FIG. 6 illustrates method 600 of (a) ingesting the one or more normalized data records and (b) compressing and/or storing the normalized record(s) into a time-ordered temporal sequence for effective processing of the normalized record(s) and for removing duplicate data of the normalized data record(s), according to an embodiment.

Figure 7:
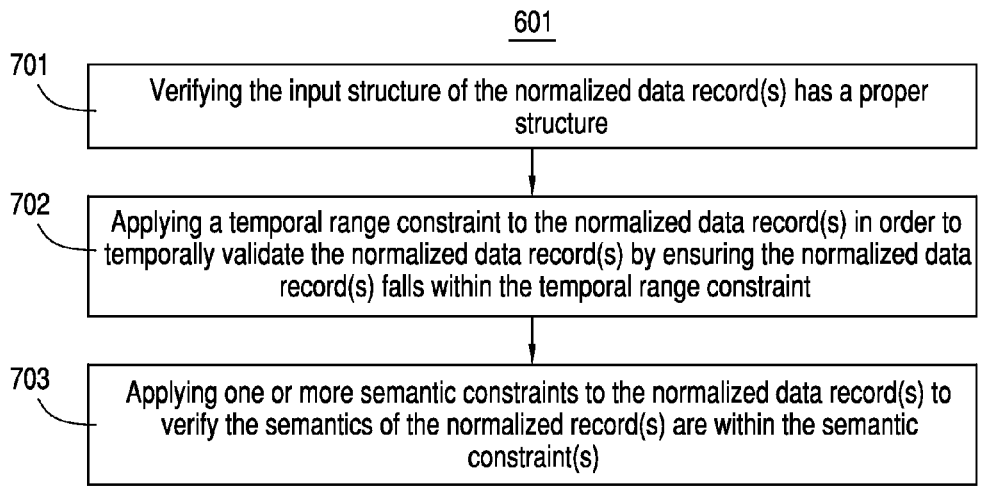
FIG. 7 illustrates a flow chart of an exemplary activity of validating one or more normalized data records, according to the embodiment of FIG. 6.

Method 600 can comprise activity 601 of validating one or more normalized data records. FIG. 7 illustrates an exemplary activity 601, according to the embodiment of FIG. 6.

Referring to FIG. 7, activity 601 can comprise activity 701 of verifying the input structure of the normalized data record(s) has a proper structure.

Further, activity 601 can comprise activity 702 of applying a temporal range constraint to the normalized data record(s) in order to temporally validate the normalized data record(s) by ensuring the normalized data record(s) falls within the temporal range constraint. For example, the temporal constraint can comprise data having a data record timestamp greater than a predetermined amount of time (e.g., 900 seconds). Further, performing activity 702 can comprise scoring the temporal accuracy of the normalized record.

Further still, activity 601 can comprise activity 703 of applying one or more semantic constraints to the normalized data record(s) to verify the semantics of the normalized record(s) are within the semantic constraint(s). In some embodiments, performing activity 703 can comprise scoring the semantic accuracy of the normalized data record.

Returning to FIG. 6, method 600 can comprise activity 602 of discovering a network topology of a network. The network can be similar or identical to network 200 (FIG. 2). In some embodiments, method 600 can comprise activity 603 of generating a topology key representative of the discovered network topology.

Method 600 can comprise activity 604 of organizing, encoding, and/or arranging temporally the normalized data record. Further, method 600 can comprise (a) activity 605 of removing obsolete data from the normalized data record; activity 606 of suppressing duplicate data of the normalized data record; and/or activity 607 of compressing and/or storing the normalized data record.

Figure 8:
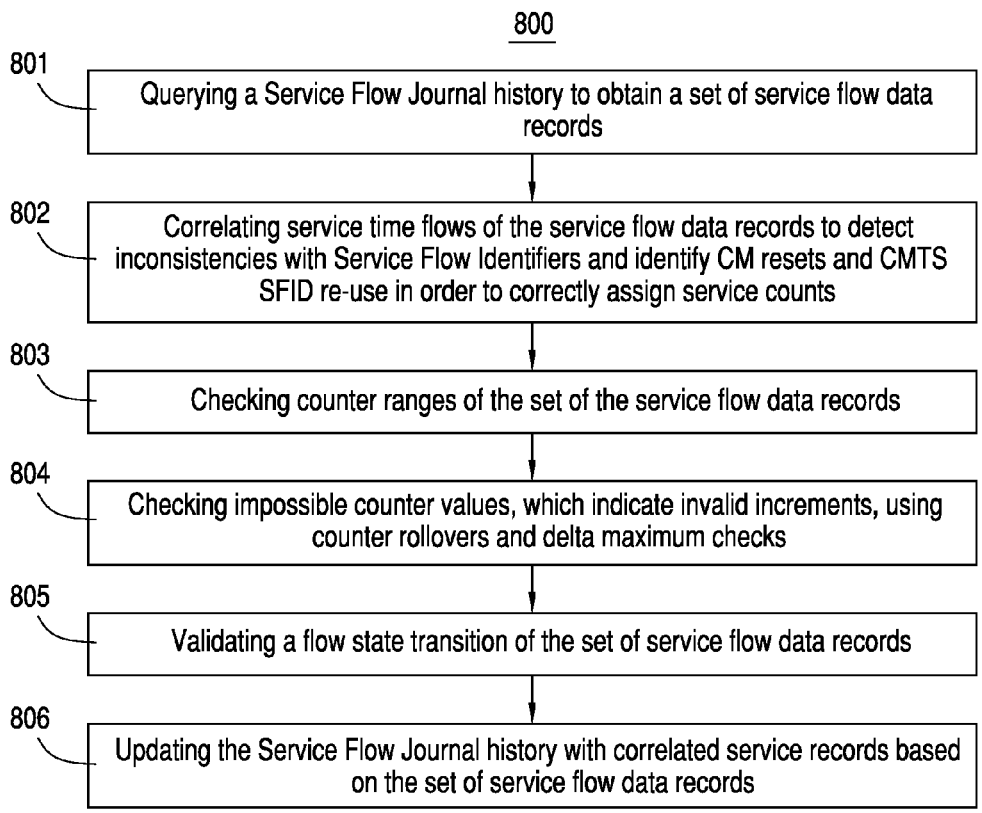
FIG. 8 illustrates a flow chart of an embodiment of a method of correlating one or more normalized records associated with individual service flows.

Returning now to FIG. 5, Pipeline Refinery 500 can comprise Service Flow Event Correlator (SFEC) 504. SFEC 504 can be similar or identical to SFEC 109 (FIG. 1). Accordingly, FIG. 8 illustrates method 800 of correlating one or more normalized records associated with individual service flows, according to an embodiment.

Method 800 can comprise activity 801 of querying a Service Flow Journal history to obtain a set of service flow data records.

Method 800 can comprise activity 802 of correlating service time flows of the service flow data records to detect inconsistencies with Service Flow Identifiers and identify CM resets and CMTS SFID re-use in order to correctly assign service counts. Performing activity 802 can comprise comparing one or more time-based parameters with the service time flows to validate the temporal/time coherence of the set of service flow data records. In some embodiments, activity 802 can occur after activity 801.

Method 800 can comprise activity 803 of checking counter ranges of the set of the service flow data records. In some embodiments, activity 803 can occur after activity 802.

Method 800 can comprise activity 804 of checking impossible counter values, which indicate invalid increments, using counter rollovers and delta maximum checks. In some embodiments, activity 804 can occur after activity 803.

Method 800 can comprise activity 805 of validating a flow state transition of the set of service flow data records. In some embodiments, one or more of activities 802 through 805 can occur simultaneously with each other. In other embodiments, one or more of activities 802 through 805 can be omitted.

Method 800 can comprise activity 806 of updating the Service Flow Journal history with correlated service records based on the set of service flow data records. In many embodiments, activity 806 can occur after one or more of activities 801 through 805.

Returning now to FIG. 5, Pipeline Refinery 500 can comprise Link Discovery Mechanism 505. Link Discoverer Mechanism can be similar or identical to Link Discovery Mechanism 108 (FIG. 1). For example, Link Discovery Mechanism 505 can discover device and connectivity relationships within the network across all data records in the data stream and integrate the new information with previously discovered topology relationships.

The normalized data record(s) are then provided to Pipeline Internal Cache 506 where the normalized data record(s) are cached and can be made available to Pipeline Web Services 507, Journaling Scheduler 508, and/or Refinery Manager 509. Pipeline Web Services 507 can comprise one or more services, such as, for example, topology service, usage service, and/or capacity service. Each of these services can then be exposed to software application(s) 503 that can then efficiently query Pipeline Refinery 500 for network data.

Returning now to FIGS. 1 & 2, in many embodiments, Pipeline Meter 103 can provide real-time subscriber metering and bandwidth policy monitoring for network 200. In some embodiments, Pipeline Meter 103 can be used to provide metering of defined usage and bandwidth policies and rules. As illustrated at FIG. 2, Pipeline Meter 103 can exist at third network layer 204. In other embodiments, Pipeline Meter 103 can exist at one or more different network layers of network layers 201.

Meanwhile, Pipeline Analytics Toolkit 104 can provide end users with insights into subscriber, service, and capacity usage. As illustrated at FIG. 2, Pipeline Analytics Toolkit 104 can exist at fourth network layer 205. In other embodiments, Pipeline Analytics Toolkit 104 can exist at one or more different network layers of network layers 201.

Further, Pipeline Emulator 105 can provide a scalability test bed for an IPDR application. For example, in some embodiments, Pipeline Emulator 105 (FIG. 1) can provide additional data records forming additional data record streams for testing of system 100 (FIG. 1). As illustrated at FIG. 2, Pipeline Emulator 105 can exist at first network layer 202. In other embodiments, Pipeline Emulator 105 can exist at one or more different network layers of network layers 201.

Figure 9:
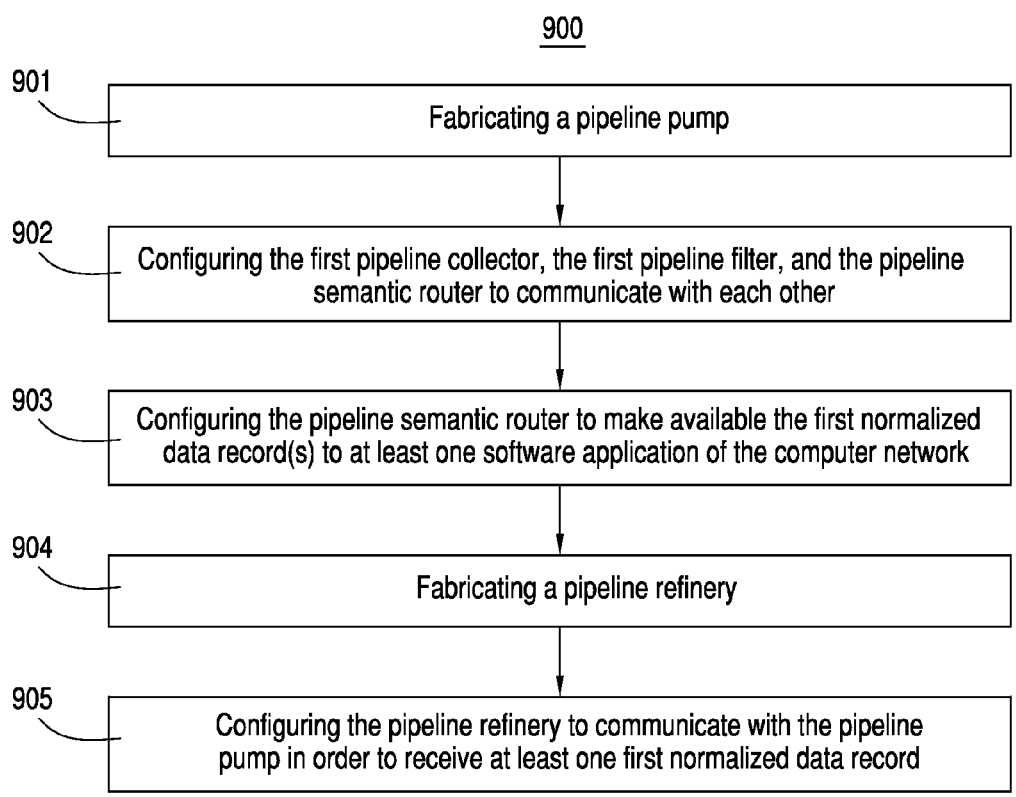
FIG. 9 illustrates a flow chart for an embodiment of a method of manufacturing a system for collecting and managing one or more data records of a computer network.

FIG. 9 illustrates a flow chart for an embodiment of method 900 of manufacturing a system for collecting and managing one or more data records of a computer network. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any other suitable order. In still other embodiments, one or more of the procedures, the processes, and/or the activities in method 900 can be combined or skipped. The system can be similar or identical to system 100 (FIG. 1), and the computer network can be similar or identical to network 200 (FIG. 2).

Figure 10:
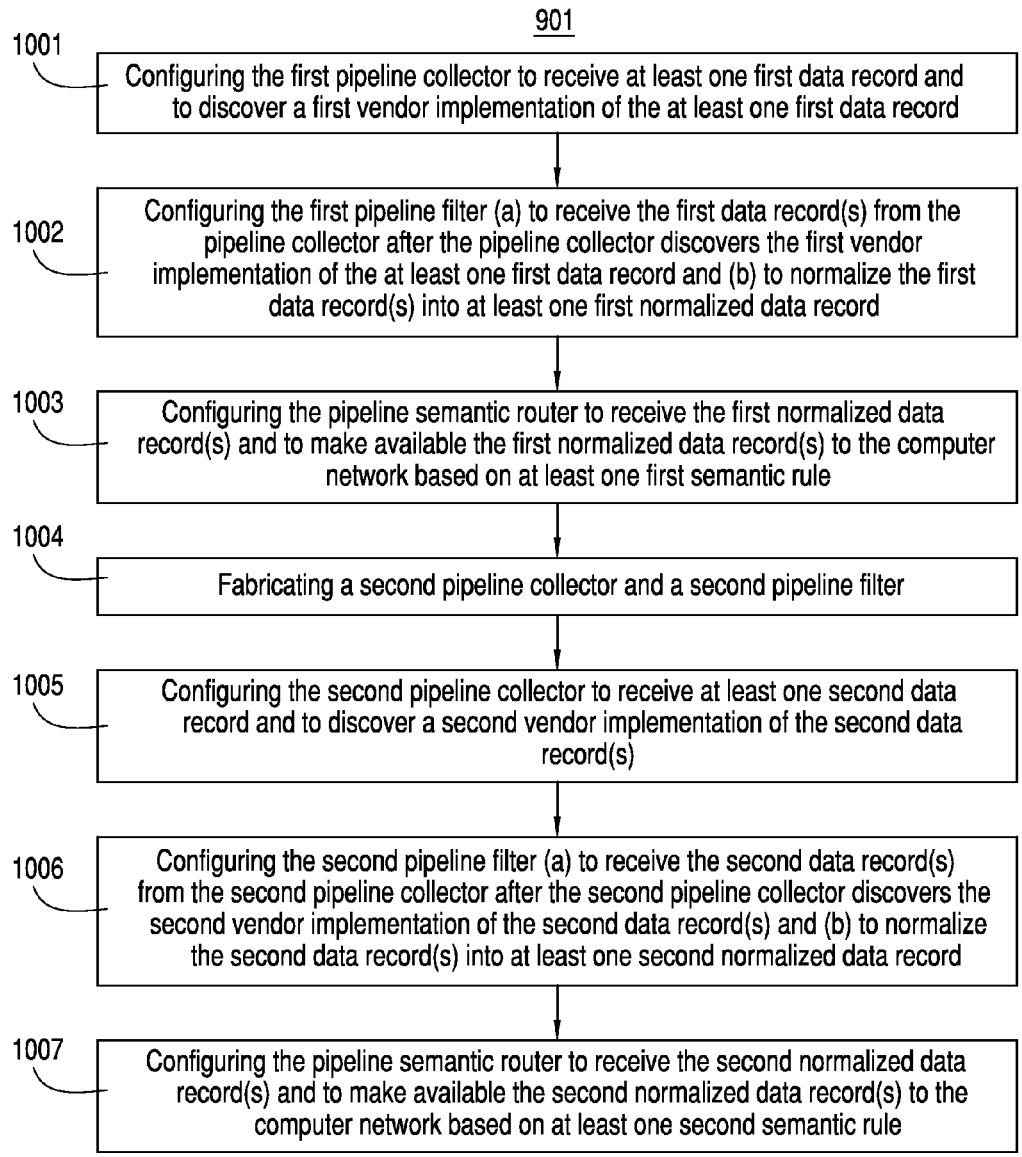
FIG. 10 illustrates a flow chart of an exemplary activity of fabricating a pipeline pump, according to the embodiment of FIG. 9.

Method 900 can comprise activity 901 of fabricating a pipeline pump. The pipeline pump can be similar or identical to Pipeline Pump 101 (FIGS. 1 & 2) and/or Pipeline Pump 300 (FIG. 3). For example, the pipeline pump can comprise a first pipeline collector, a first pipeline filter, and/or a pipeline semantic router. The first pipeline collector can be similar or identical to Pipeline Collector 106 (FIG. 1) and/or one or more of Pipeline Collectors 302 (FIG. 3). The first pipeline filter can be similar or identical to Pipeline Filter 110 (FIG. 1) and/or one or more of Pipeline Filters 308 (FIG. 3). Further, the pipeline semantic router can be similar or identical to Pipeline Semantic Router 107 (FIG. 1). FIG. 10 illustrates an exemplary activity 901, according to the embodiment of FIG. 9.

Activity 901 can comprise activity 1001 of configuring the first pipeline collector to receive at least one first data record and to discover a first vendor implementation of the at least one first data record. The data record(s) of the computer network can comprise the first data record(s).

Activity 901 can comprise activity 1002 of configuring the first pipeline filter (a) to receive the first data record(s) from the pipeline collector after the pipeline collector discovers the first vendor implementation of the at least one first data record and (b) to normalize the first data record(s) into at least one first normalized data record. The first pipeline filter can be associated with the first vendor implementation of the first data record(s).

Activity 901 can comprise activity 1003 of configuring the pipeline semantic router to receive the first normalized data record(s) and to make available the first normalized data record(s) to the computer network based on at least one first semantic rule. The first semantic rule(s) can be similar or identical to the first semantic rule(s) described above with respect to pipeline pump 101 (FIGS. 1 & 2) and/or Pipeline Semantic Router 107 (FIG. 1).

Activity 901 can comprise activity 1004 of fabricating a second pipeline collector and a second pipeline filter. The second pipeline collector can be similar or identical to Pipeline Collector 106 (FIG. 1) and/or one or more of Pipeline Collectors 302 (FIG. 3). The second pipeline filter can be similar or identical to Pipeline Filter 110 (FIG. 1) and/or one or more of Pipeline Filters 308 (FIG. 3).

Activity 901 can comprise activity 1005 of configuring the second pipeline collector to receive at least one second data record and to discover a second vendor implementation of the second data record(s). The data record(s) of the computer network can comprise the second data record(s).

Activity 901 can comprise activity 1006 of configuring the second pipeline filter (a) to receive the second data record(s) from the second pipeline collector after the second pipeline collector discovers the second vendor implementation of the second data record(s) and (b) to normalize the second data record(s) into at least one second normalized data record. The second pipeline filter can be associated with the second vendor implementation of the second data record(s). In some embodiments, activities 1004 through 1006 can be omitted.

Activity 901 can comprise activity 1007 of configuring the pipeline semantic router to receive the second normalized data record(s) and to make available the second normalized data record(s) to the computer network based on at least one second semantic rule. In some embodiments, the first semantic rule(s) can comprise the second semantic rule(s). In many embodiments, one or more of activities 1001 through 1007 can occur approximately simultaneously with each other.

Returning now to FIG. 9, method 900 can comprise activity 902 of configuring the first pipeline collector, the first pipeline filter, and the pipeline semantic router to communicate with each other.

Method 900 can comprise activity 903 of configuring the pipeline semantic router to make available the first normalized data record(s) to at least one software application of the computer network. The software application(s) can be similar or identical to software application(s) 206 (FIG. 2) and/or software application(s) 319 (FIG. 3).

Figure 11:
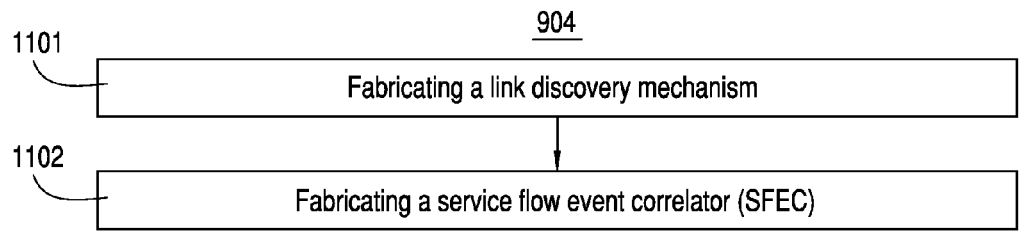
FIG. 11 illustrates a flow chart of an exemplary activity of fabricating a pipeline refinery, according to the embodiment of FIG. 9.

Method 900 can comprise activity 904 of fabricating a pipeline refinery. The pipeline refinery can be similar or identical to Pipeline Refinery 102 (FIGS. 1 & 2) and/or Pipeline Refinery 500 (FIG. 5). FIG. 11 illustrates an exemplary activity 904, according to the embodiment of FIG. 9.

Activity 904 can comprise activity 1101 of fabricating a link discovery mechanism. The link discovery mechanism can be similar or identical to link discovery mechanism 108 (FIG. 1) and/or link discovery mechanism 505 (FIG. 5). In some embodiments, performing activity 1101 can comprise: (a) configuring the link discovery mechanism to generate a network topology representation of the network topology of the computer network; and/or (b) configuring the link discovery mechanism to provide the network topology representation to a network topology database to be stored at the network topology database.

Activity 904 can comprise activity 1102 of fabricating a service flow event correlator (SFEC). The SFEC can be similar or identical to SFEC 109 (FIG. 1) and/or SFEC 504 (FIG. 5). Performing activity 1102 can comprise: (a) configuring the SFEC to temporally validate the at least one first normalized data record by ensuring that the at least one first normalized data record falls within a temporal range constraint; and/or (b) configuring the SFEC to verify that the at least one first normalized data record satisfies at least one semantic constraint.

Returning again to FIG. 9, method 900 can comprise activity 905 of configuring the pipeline refinery to communicate with the pipeline pump in order to receive the at least one first normalized data record.

Method 900 can comprise activity 906 of configuring the second pipeline collector, the second pipeline filter, and the pipeline semantic router to communicate with each other. In some embodiments, activity 906 can be omitted. In various embodiments, activity 906 can occur approximately simultaneously with activity 902 and/or activity 905.

Figure 12:
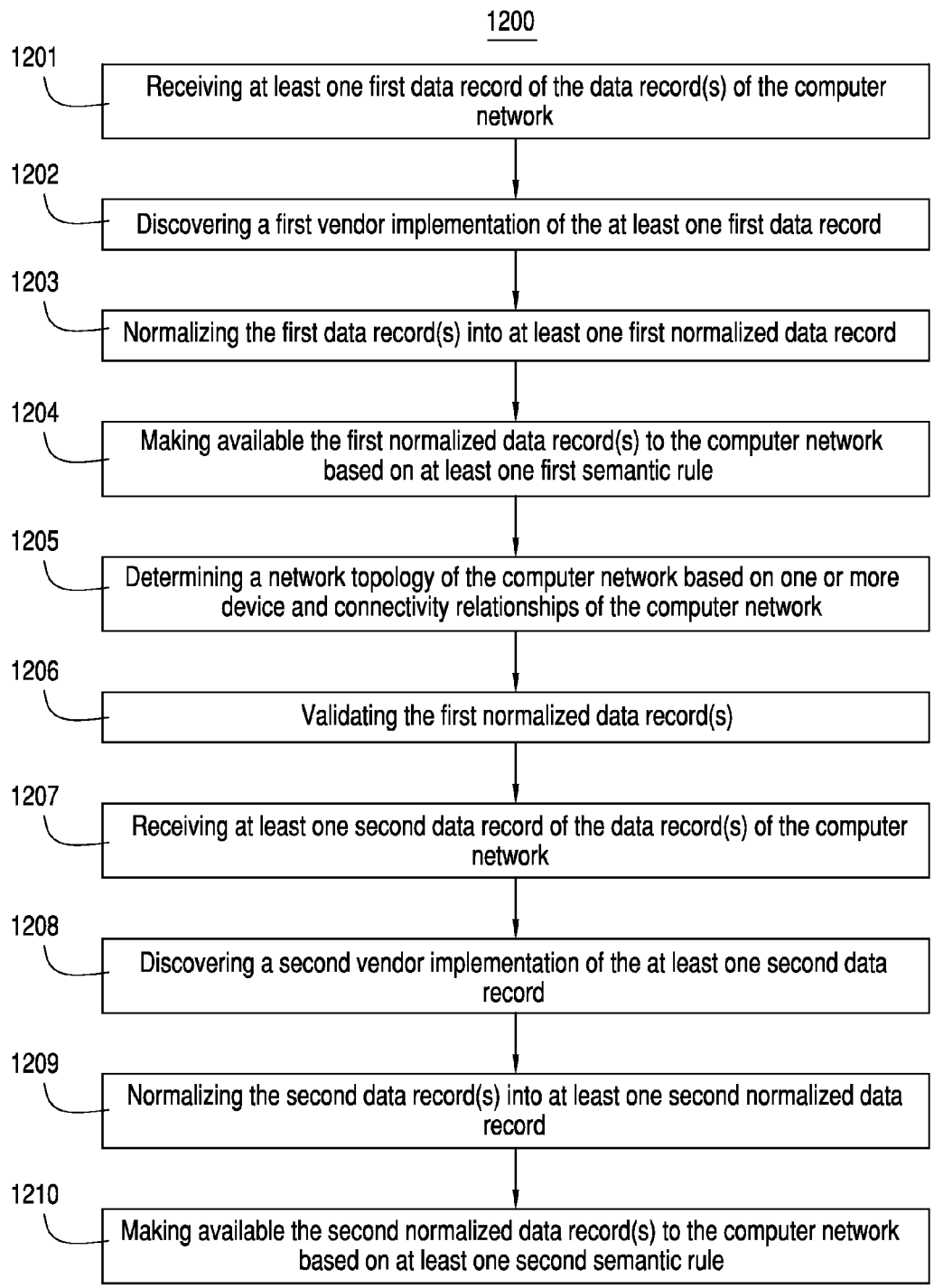
FIG. 12 illustrates a flow chart for an embodiment of a method for collecting and managing one or more data records of a computer network.

FIG. 12 illustrates a flow chart for an embodiment of method 1200 for collecting and managing one or more data records of a computer network. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any other suitable order. In still other embodiments, one or more of the procedures, the processes, and/or the activities in method 1200 can be combined or skipped. The system can be similar or identical to system 100 (FIG. 1), and the computer network can be similar or identical to network 200 (FIG. 2).

Figure 13:
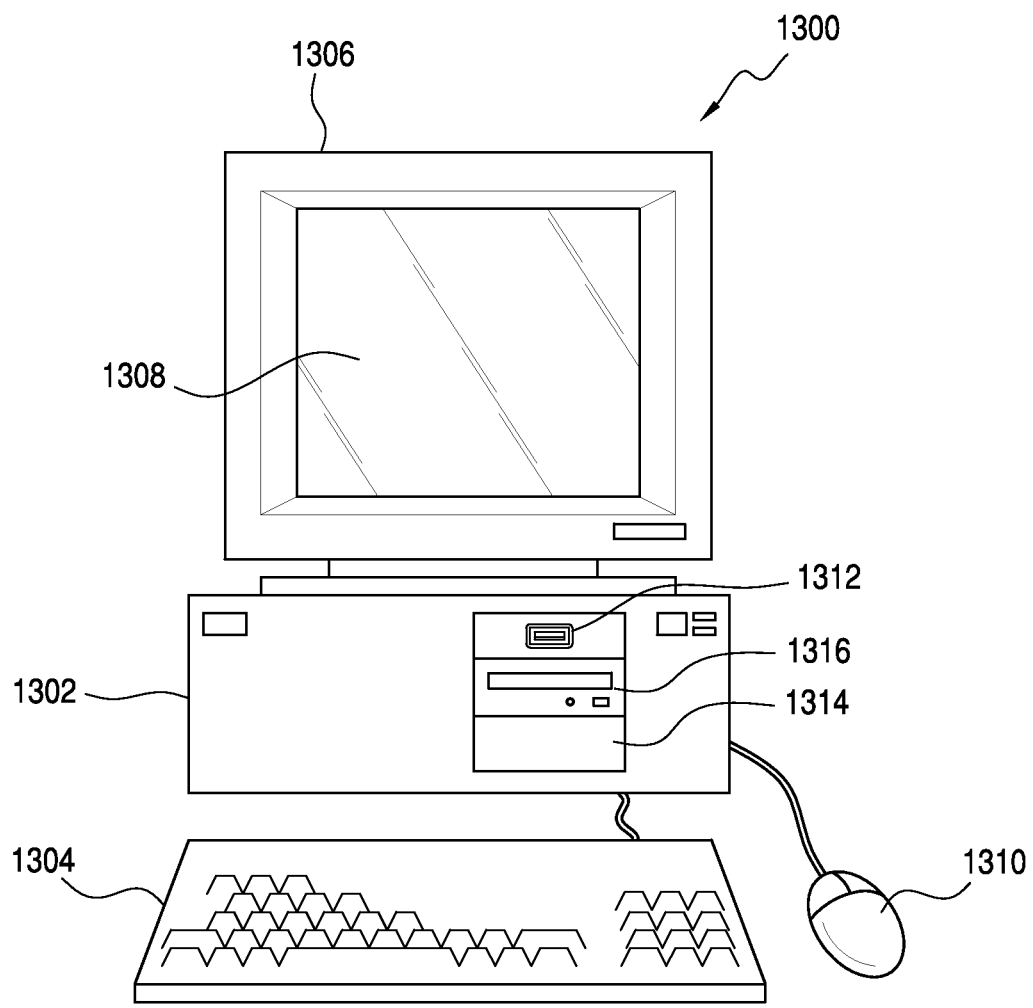
FIG. 13 illustrates a computer system that is suitable for implementing an embodiment of the system of FIGS. 1 & 2), the Pipeline Pump of FIG. 3, the Pipeline Refinery of FIG. 5, and/or one or more of the methods of FIGS. 4 through 8 and FIG. 12.

In many embodiments, at least part of method 1200 can be implemented as one or more computer instructions configured to be run at one or more processing modules of a computer system and stored at one or more memory storage modules of the computer system. The computer system can be similar or identical to computer system 1300 (FIG. 13).

Method 1200 can comprise activity 1201 of receiving at least one first data record of the data record(s) of the computer network. The data record(s) can be similar or identical to the data record(s) described above with respect to system 100 (FIGS. 1 & 2).

Method 1200 can comprise activity 1202 of discovering a first vendor implementation of the at least one first data record. The first vendor implementation can be similar or identical to any of the vendor implementation(s) described with respect to system 100 (FIGS. 1 & 2). In some embodiments, activity 1202 can occur automatically when or after activity 1201 occurs.

Method 1200 can comprise activity 1203 of normalizing the first data record(s) into at least one first normalized data record. Performing activity 1203 can be similar or identical to normalizing the data record(s) as described above with respect to system 100 (FIGS. 1 & 2).

Method 1200 can comprise activity 1204 of making available the first normalized data record(s) to the computer network based on at least one first semantic rule. The first semantic rule(s) can be similar or identical to the semantic rule(s) described above with respect to system 100 (FIGS. 1 & 2).

Method 1200 can comprise activity 1205 of determining a network topology of the computer network based on one or more device and connectivity relationships of the computer network. The network topology can be similar or identical to one of the network topologies described above with respect to system 100 (FIGS. 1 & 2). Further, the device and connectivity relationship(s) can be similar or identical to the device and connectivity relationship(s) described above with respect to system 100 (FIGS. 1 & 2). In some embodiments, performing activity 1205 can comprise: (a) generating a network topology representation of the network topology of the computer network; and (b) providing the network topology representation to a network topology database to be stored at the network topology database. The network topology representation can be similar or identical to the network topology representation described above with respect to system 100 (FIGS. 1 & 2). Further, the network topology database can be similar or identical to the network topology database described above with respect to system 100 (FIGS. 1 & 2) and/or Pipeline Refinery 500 (FIG. 5).

Method 1200 can comprise activity 1206 of validating the first normalized data record(s). Performing activity 1206 can comprise: (a) temporally validating the first normalized data record(s) by ensuring that the first normalized data record(s) falls within a temporal range constraint; and/or (b) verifying that the first normalized data record(s) satisfy at least one semantic constraint. The temporal range constraint and/or the semantic constraints can be similar or identical to the temporal range constraint and/or the semantic constraints described above with respect to system 100 (FIGS. 1 & 2).

Method 1200 can comprise activity 1207 of receiving at least one second data record of the data record(s) of the computer network.

Method 1200 can comprise activity 1208 of discovering a second vendor implementation of the at least one second data record. The second vendor implementation can be similar or identical to any of the vendor implementation(s) described with respect to system 100 (FIGS. 1 & 2). In some embodiments, activity 1208 can occur automatically when or after activity 1207 occurs.

Method 1200 can comprise activity 1209 of normalizing the second data record(s) into at least one second normalized data record. Performing activity 1209 can be similar or identical to normalizing the data record(s) as described above with respect to system 100 (FIGS. 1 & 2).

Method 1200 can comprise activity 1210 of making available the second normalized data record(s) to the computer network based on at least one second semantic rule. The second semantic rule(s) can be similar or identical to the semantic rule(s) described above with respect to system 100 (FIGS. 1 & 2).

Figure 14:
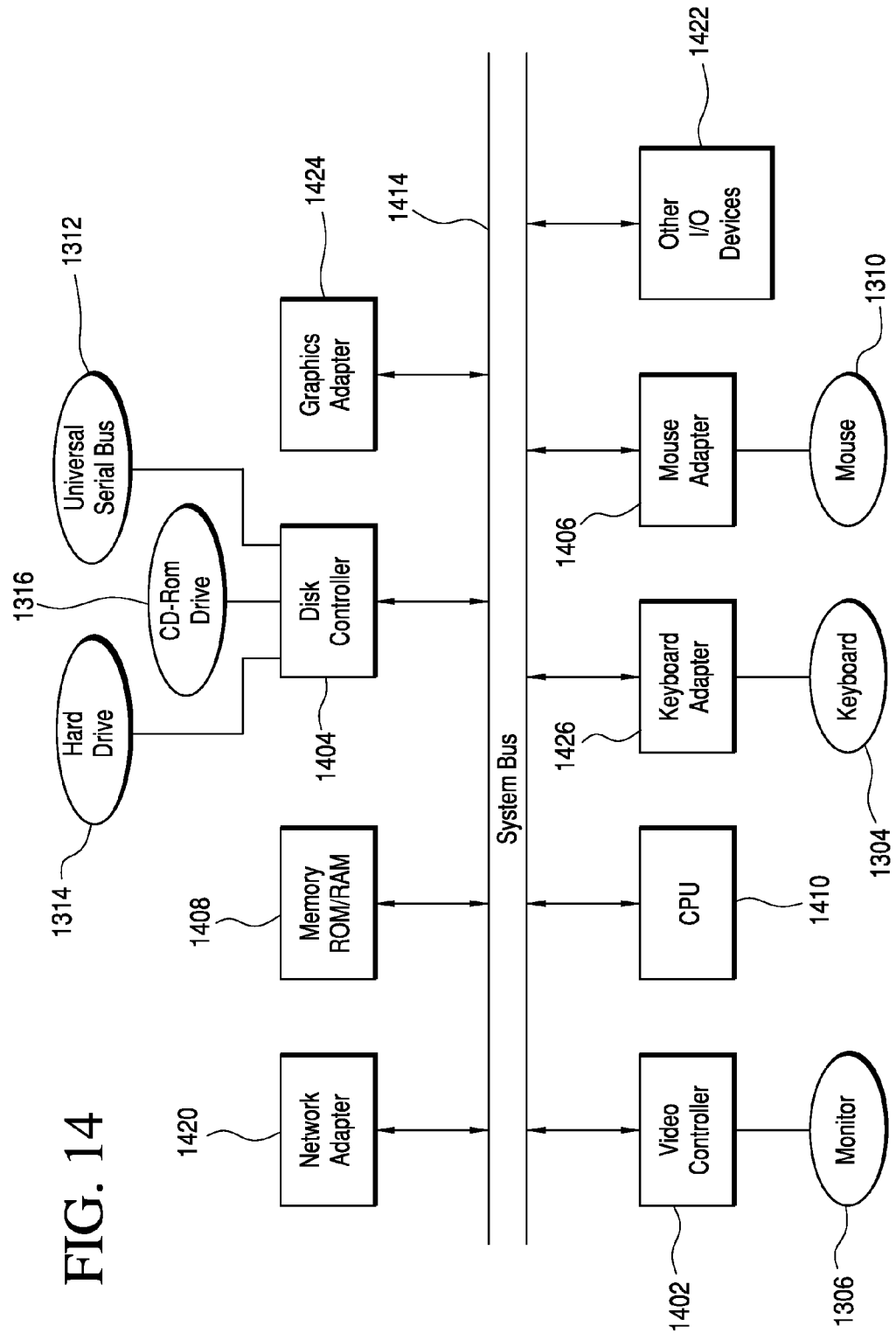
FIG. 14 illustrates a representative block diagram of an example of the elements included in the circuit boards inside chassis of the computer system of FIG. 13.

Turning to the next drawing, FIG. 13 illustrates an exemplary embodiment of computer system 1300, all of which or a portion of which can be suitable for implementing an embodiment of system 100 (FIGS. 1 & 2), parts of network 200 (FIG. 2), Pipeline Pump 300 (FIG. 3), Pipeline Refinery 500 (FIG. 5), as well as method 400 (FIG. 4), method 600 (FIG. 6), method 800 (FIG. 8), method 900 (FIG. 9), and/or method 1200 (FIG. 12) and/or any of the various procedures, processes, and/or activities of method 400 (FIG. 4), method 600 (FIG. 6), method 800 (FIG. 8), method 900 (FIG. 9), and/or method 1200 (FIG. 12). As an example, chassis 1302 (and its internal components) can be suitable for implementing system 100 (FIGS. 1 & 2). Computer system 1300 includes chassis 1302 containing one or more circuit boards (not shown), Universal Serial Bus (USB) 1312, Compact Disc Read-Only Memory (CD-ROM) and/or Digital Video Disc (DVD) drive 1316, and hard drive 1314. A representative block diagram of the elements included on the circuit boards inside chassis 1302 is shown in FIG. 13. Central processing unit (CPU) 1410 in FIG. 14 is coupled to system bus 1414 in FIG. 14. In various embodiments, the architecture of CPU 1410 can be compliant with any of a variety of commercially distributed architecture families.

System bus 1414 also is coupled to memory 1408, where memory 1408 includes both read only memory (ROM) and random access memory (RAM). Non-volatile portions of memory 1408 or the ROM can be encoded with a boot code sequence suitable for restoring computer system 1300 (FIG. 13) to a functional state after a system reset. In addition, memory 1408 can include microcode such as a Basic Input-Output System (BIOS). In some examples, the one or more storage modules of the various embodiments disclosed herein can include memory 1408, USB 1312 (FIGS. 13-14), hard drive 1314 (FIGS. 13-14), and/or CD-ROM or DVD drive 1316 (FIGS. 13-14). In the same or different examples, the one or more storage modules of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Examples of common operating systems can include Microsoft® Windows, Mac® operating system (OS), UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 14, various I/O devices such as disk controller 1404, graphics adapter 1424, video controller 1402, keyboard adapter 1426, mouse adapter 1406, network adapter 1420, and other I/O devices 1422 can be coupled to system bus 1414. Keyboard adapter 1426 and mouse adapter 1406 are coupled to keyboard 1304 (FIGS. 13-14) and mouse 1310 (FIGS. 13-14), respectively, of computer system 1300 (FIG. 13). While graphics adapter 1424 and video controller 1402 are indicated as distinct units in FIG. 14, video controller 1402 can be integrated into graphics adapter 1424, or vice versa in other embodiments. Video controller 1402 is suitable for refreshing monitor 1306 (FIGS. 13-14) to display images on a screen 1308 (FIG. 13) of computer system 1300 (FIG. 13). Disk controller 1404 can control hard drive 1314 (FIGS. 13-14), USB 1312 (FIGS. 13-14), and CD-ROM drive 1316 (FIGS. 13-14). In other embodiments, distinct units can be used to control each of these devices separately.

In some embodiments, network adapter 1420 can be part of a WNIC (wireless network interface controller) card (not shown) plugged or coupled to an expansion port (not shown) in computer system 1300. In other embodiments, the WNIC card can be a wireless network card built into computer system 1300. A wireless network adapter can be built into computer system 1300 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 1420 can be a wired network adapter.

Although many other components of computer system 1300 (FIG. 13) are not shown, such components and their interconnection are well known to those of ordinary skill in the art. Accordingly, further details concerning the construction and composition of computer system 1300 and the circuit boards inside chassis 1302 (FIG. 13) are not discussed herein.

When computer system 1300 in FIG. 13 is running, program instructions stored on a USB-equipped electronic device connected to USB 1312, on a CD-ROM or DVD in CD-ROM and/or DVD drive 1316, on hard drive 1314, or in memory 1408 (FIG. 14) are executed by CPU 1410 (FIG. 14). A portion of the program instructions, stored on these devices, can be suitable for carrying out at least part of system 100 (FIGS. 1 & 2), parts of network 200 (FIG. 2), Pipeline Pump 300 (FIG. 3), Pipeline Refinery 500 (FIG. 5), method 400 (FIG. 4), method 600 (FIG. 6), method 800 (FIG. 8), method 900 (FIG. 9) and/or method 1200 (FIG. 12).

Although computer system 1300 is illustrated as a desktop computer in FIG. 13, there can be examples where computer system 1300 may take a different form factor while still having functional elements similar to those described for computer system 1300. In some embodiments, computer system 1300 can comprise a single computer, a single server, or a cluster or collection of computers or servers, or a cloud of computers or servers. Typically, a cluster or collection of servers can be used when the demand on computer system 1300 exceeds the reasonable capability of a single server or computer.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the activities of method 400 (FIG. 4), method 500 (FIG. 5), method 600 (FIG. 6), method 900 (FIG. 9) and/or method 1200 (FIG. 12) may be comprised of many different procedures, processes, and activities and be performed by many different modules, in many different orders, that any element of FIGS. 1-14 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for collecting and managing one or more data records of a computer network, the system comprising:
   a pipeline pump comprising a first pipeline collector, a first pipeline filter, and a pipeline semantic router,
   wherein the first pipeline collector, the first pipeline filter, and the pipeline semantic router are configured to communicate with each other;
   the one or more data records of the computer network comprise at least one first data record;
   the first pipeline collector is configured to receive the at least one first data record and to discover a first vendor implementation of the at least one first data record;
   the first pipeline filter is associated with the first vendor implementation of the at least one first data record, is configured to receive the at least one first data record from the first pipeline collector after the first pipeline collector discovers the first vendor implementation of the at least one first data record, and is configured to normalize the at least one first data record into at least one first normalized data record; and
   the pipeline semantic router is configured to receive the at least one first normalized data record and to make available the at least one first normalized data record to the computer network based on at least one first semantic rule,
   wherein the at least one semantic rule comprises at least one of:
   a source of the at least one first normalized data record;
   a data model of the at least one first normalized data record;
   one or more routing destinations of the at least one first normalized data record;
   one or more specific data model elements to include or exclude from within the data model of the at least one first normalized data record;
   a format of the first normalized data record; or
   a transmission protocol employed to forward the at least one first normalized data record.

2. The system of claim 1 wherein the pipeline semantic router is configured to make available the at least one first normalized data record to at least one software application of the computer network.

3. The system of claim 1 further comprising a pipeline refinery comprising a link discovery mechanism, wherein the pipeline refinery is configured to communicate with the pipeline pump in order to receive the at least one first normalized data record, and the link discovery mechanism is configured to determine a network topology of the computer network based on one or more device and connectivity relationships of the computer network.

4. The system of claim 3 wherein the link discovery mechanism is configured to generate a network topology representation of the network topology of the computer network, and the link discovery mechanism is configured to provide the network topology representation to a network topology database to be stored at the network topology database.

5. The system of claim 1 further comprising a pipeline refinery comprising a service flow event correlator, wherein the pipeline refinery is configured to communicate with the pipeline pump in order to receive the at least one first normalized data record, and the service flow event correlator is configured to validate the at least one first normalized data record.

6. The system of claim 5 wherein the service flow event correlator is configured to at least one of:
   temporally validate the at least one first normalized data record by ensuring that the at least one first normalized data record falls within a temporal range constraint; or
   verify that the at least one first normalized data record satisfies at least one semantic constraint.

7. The system of claim 1 wherein the pipeline pump further comprises a second pipeline collector and a second pipeline filter, wherein the second pipeline collector, the second pipeline filter, and the pipeline semantic router are configured to communicate with each other, wherein the one or more data records of the computer network further comprise at least one second data record, wherein the second pipeline collector is configured to receive the at least one second data record and to discover a second vendor implementation of the at least one second data record, the first vendor implementation being different than the second vendor implementation, wherein the second pipeline filter is associated with the second vendor implementation of the at least one second data record, is configured to receive the at least one second data record from the second pipeline collector after the second pipeline collector discovers the second vendor implementation of the at least one second data record, and is configured to normalize the at least one second data record into at least one second normalized data record, and wherein the pipeline semantic router is configured to receive the at least one second normalized data record and to make available the at least one second normalized data record to the computer network based on the at least one second semantic rule.

8. The system of claim 7 wherein the at least one first semantic rule comprises the at least one second semantic rule.

9. A method of manufacturing a system for collecting and managing one or more data records of a computer network, the method comprising:
   fabricating a pipeline pump comprising a first pipeline collector, a first pipeline filter, and a pipeline semantic router; and
   configuring the first pipeline collector, the first pipeline filter, and the pipeline semantic router to communicate with each other,
   wherein fabricating the pipeline pump comprises: configuring the first pipeline collector to receive at least one first data record and to discover a first vendor implementation of the at least one first data record, the one or more data records of the computer network comprising the at least one first data record; configuring the first pipeline filter (a) to receive the at least one first data record from the pipeline collector after the pipeline collector discovers the first vendor implementation of the at least one first data record and (b) to normalize the at least one first data record into at least one first normalized data record, the first pipeline filter being associated with the first vendor implementation of the at least one first data record; and configuring the pipeline semantic router to receive the at least one first normalized data record and to make available the at least one first normalized data record to the computer network based on at least one first semantic rule, wherein the at least one semantic rule comprises at least one of:

a source of the at least one first normalized data record;

a data model of the at least one first normalized data record;

one or more routing destinations of the at least one first normalized data record;

one or more specific data model elements to include or exclude from within the data model of the at least one first normalized data record;

a format of the first normalized data record; or a transmission protocol employed to forward the at least one first normalized data record.

10. The method of claim 9 further comprising configuring the pipeline semantic router to make available the at least one first normalized data record to at least one software application of the computer network.

11. The method of claim 9 further comprising fabricating a pipeline refinery and configuring the pipeline refinery to communicate with the pipeline pump in order to receive the at least one first normalized data record, wherein fabricating the pipeline refinery comprises fabricating a link discovery mechanism, the link discovery mechanism being configured to determine a network topology of the computer network based on one or more device and connectivity relationships of the computer network.

12. The method of claim 11 wherein fabricating the link discovery mechanism comprises configuring the link discovery mechanism to generate a network topology representation of the network topology of the computer network and configuring the link discovery mechanism to provide the network topology representation to a network topology database to be stored at the network topology database.

13. The method of claim 9 further comprising fabricating a pipeline refinery and configuring the pipeline refinery to communicate with the pipeline pump in order to receive the at least one first normalized data record, wherein fabricating the pipeline refinery comprises fabricating a service flow event correlator, the service flow event correlator being configured to validate the at least one first normalized data record.

14. The method of claim 13 further comprising at least one of configuring the service flow event correlator to temporally validate the at least one first normalized data record by ensuring that the at least one first normalized data record falls within a temporal range constraint or configuring the service flow event correlator to verify that the at least one first normalized data record satisfies at least one semantic constraint.

15. The method of claim 9 wherein fabricating the pipeline pump further comprises fabricating a second pipeline collector and a second pipeline filter, the method further comprises configuring the second pipeline collector, the second pipeline filter, and the pipeline semantic router to communicate with each other, and fabricating the pipeline pump further comprises:

configuring the second pipeline collector to receive at least one second data record and to discover a second vendor implementation of the at least one second data record, the one or more data records of the computer network comprising the at least one second data record;

configuring the second pipeline filter (a) to receive the at least one second data record from the second pipeline collector after the second pipeline collector discovers the second vendor implementation of the at least one second data record and (b) to normalize the at least one second data record into at least one second normalized data record, the second pipeline filter being associated with the second vendor implementation of the at least one second data record; and configuring the pipeline semantic router to receive the at least one second normalized data record and to make available the at least one second normalized data record to the computer network based on at least one second semantic rule.

16. A method for collecting and managing one or more data records of a computer network, the method being configured to be implemented as one or more computer instructions configured to be run at one or more processing modules of a computer system and stored at one or more memory storage modules of the computer system, the method comprising:

executing one or more first computer instructions configured to receive at least one first data record of the one or more data records of the computer network;

executing one or more second computer instructions configured to discover a first vendor implementation of the at least one first data record;

executing one or more third computer instructions configured to normalize the at least one first data record into at least one first normalized data record; and executing one or more fourth computer instructions configured to make available the at least one first normalized data record to the computer network based on at least one first semantic rule; wherein: the one or more computer instructions comprise the first, second, third, and fourth computer instructions;

executing one or more fifth computer instructions configured to receive at least one second data record of the one or more data records of the computer network;

executing one or more sixth computer instructions configured to discover a second vendor implementation of the at least one second data record, the second vendor implementation being different from the first vendor implementation;

executing one or more seventh computer instructions configured to normalize the at least one second data record into at least one second normalized data record; and executing one or more eighth computer instructions configured to make available the at least one second normalized data record to the computer network based on at least one second semantic rule.

17. The method of claim 16 further comprising executing one or more fifth computer instructions configured to determine a network topology of the computer network based on one or more device and connectivity relationships of the computer network.

18. The method of claim 17 wherein executing the one or more fifth computer instructions comprises executing one or more sixth computer instructions configured to generate a network topology representation of the network topology of the computer network and executing one or more seventh computer instructions configured to provide the network topology representation to a network topology database to be stored at the network topology database.

19. The method of claim 16 further comprising executing one or more fifth computer instructions configured to validate the at least one first normalized data record.

20. The method of claim 19 wherein executing the one or more fifth computer instructions comprises to at least one of:

executing one or more sixth computer instructions configured to temporally validate the at least one first normalized data record by ensuring that the at least one first normalized data record falls within a temporal range constraint; or executing one or more seventh computer instructions configured to verify that the at least one first normalized data record satisfies at least one semantic constraint.

* * * * *